United States Patent
Sandstrom

(10) Patent No.: US 11,561,983 B2
(45) Date of Patent: Jan. 24, 2023

(54) ONLINE TRAINED OBJECT PROPERTY ESTIMATOR

(71) Applicant: ThroughPuter, Inc., Williamsburg, VA (US)

(72) Inventor: Mark Henrik Sandstrom, Alexandria, VA (US)

(73) Assignee: ThroughPuter, Inc., Williamsburg, VA (US)

(*) Notice: Subject to any disclaimer, the term of this patent is extended or adjusted under 35 U.S.C. 154(b) by 384 days.

(21) Appl. No.: 16/812,158

(22) Filed: Mar. 6, 2020

(65) Prior Publication Data

US 2020/0285645 A1    Sep. 10, 2020

Related U.S. Application Data

(60) Provisional application No. 62/876,087, filed on Jul. 19, 2019, provisional application No. 62/871,096, filed on Jul. 6, 2019, provisional application No. 62/868,756, filed on Jun. 28, 2019, provisional application No. 62/857,573, filed on Jun. 5, 2019, provisional application No. 62/827,435, filed on Apr. 1, 2019, provisional application No. 62/822,569, filed on Mar. 22, 2019, provisional application No. 62/815,153, filed on Mar. 7, 2019.

(51) Int. Cl.
| | |
|---|---|
| *G06F 16/2455* | (2019.01) |
| *G06F 16/901* | (2019.01) |
| *G06N 20/00* | (2019.01) |
| *G06K 9/62* | (2022.01) |
| *G06F 16/23* | (2019.01) |

(52) U.S. Cl.
CPC ........ *G06F 16/24568* (2019.01); *G06F 16/23* (2019.01); *G06F 16/9017* (2019.01); *G06K 9/6256* (2013.01); *G06K 9/6269* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,702,629 | B2 | 4/2010 | Cytron et al. |
| 8,189,905 | B2 | 5/2012 | Eaton et al. |
| 9,111,073 | B1 | 8/2015 | Jiang et al. |
| 10,013,546 | B1 | 7/2018 | Johansson et al. |

(Continued)

FOREIGN PATENT DOCUMENTS

| | | |
|---|---|---|
| EP | 3559889 | 1/2022 |
| RU | 2672394 C1 | 11/2018 |
| WO | 2020247800 | 12/2020 |

OTHER PUBLICATIONS

Invitation to Pay Additional Fees And, Where Applicable, Protest Fee of PCT Application No. PCT/US2020/021581 dated May 5, 2020.

(Continued)

*Primary Examiner* — Scott B Christensen

(74) *Attorney, Agent, or Firm* — Gardella Grace P.A.

(57) ABSTRACT

This disclosure describes systems and methods for using an estimator to produce values for dependent variables of streaming objects based on values of independent variables of the objects. The systems and methods may include continuously tuning the estimator based on any objects received with pre-populated values for the dependent variables.

20 Claims, 4 Drawing Sheets

(56) References Cited

U.S. PATENT DOCUMENTS

| | | | |
|---|---|---|---|
| 2008/0208777 A1 | 8/2008 | Stephens | |
| 2014/0165186 A1 | 6/2014 | Ramu et al. | |
| 2014/0344186 A1* | 11/2014 | Nadler | G06Q 10/067 705/36 R |
| 2016/0150260 A1* | 5/2016 | Ovide | H04N 21/2668 725/12 |
| 2016/0253288 A1 | 9/2016 | Reddy | |
| 2016/0277439 A1 | 9/2016 | Rotter et al. | |
| 2017/0308644 A1 | 10/2017 | van Rooyen et al. | |
| 2018/0053274 A1* | 2/2018 | Kendall | G06N 20/00 |
| 2018/0107920 A1* | 4/2018 | Jayaraman | G06F 17/11 |
| 2018/0300178 A1 | 10/2018 | Sandstrom | |
| 2019/0137955 A1* | 5/2019 | Fahrenkopf | G06F 17/15 |
| 2019/0316794 A1* | 10/2019 | Song | F24F 11/58 |
| 2019/0347586 A1* | 11/2019 | Kaulgud | G06Q 10/06393 |
| 2020/0066392 A1* | 2/2020 | Bess | G16H 50/70 |
| 2020/0090240 A1* | 3/2020 | Sinha | G06N 5/003 |
| 2020/0104737 A1* | 4/2020 | Abaci | G06N 7/005 |
| 2020/0110651 A1* | 4/2020 | Milman | G06F 11/0709 |
| 2020/0167914 A1* | 5/2020 | Stamatoyannopoulos | G06T 7/0012 |
| 2020/0285645 A1 | 9/2020 | Sandstrom | |
| 2020/0311250 A1 | 10/2020 | Sandstrom | |
| 2020/0311586 A1 | 10/2020 | Sandstrom | |
| 2020/0387594 A1 | 12/2020 | Sandstrom | |

OTHER PUBLICATIONS

International Preliminary Report on Patentability for International Application No. PCT/US2020/021581 dated Sep. 16, 2021.
International Preliminary Report on Patentability for International Application No. PCT/US2020/036394 dated Dec. 16, 2021.
Invitation to Pay Additional Fees and, Where Applicable, Protest Fee for International Application No. PCT/US2020/036394 dated Jul. 21, 2020.
International Search Report and Written Opinion for International Application No. PCT/US2020/021581 dated Jul. 22, 2020.
Gewali, et al., "Machine Learning Based Hyperspectral Image Analysis: A Survey", Rochester Institute of Technology, Rochester, NY, arXiv: 1802.08701v2, Feb. 10, 2019, pp. 1-46.
Grzegorczyk, et al., "Vector Representations of Text Data in Deep Learning", AGH University of Science and Technology, Faculty of Computer Science, Electronics and Telecommunications, Department of Computer Science, arXiv: 1901.01695v1, Jan. 7, 2019.
International Search Report and Written Opinion for International Application No. PCT/US2020/036394 dated Sep. 30, 2020.
Kaur, et al., "Multi-Factor Graphical Password for Cloud Interface Authentication Security", International Journal of Computer Applications, vol. 125, No. 7, Sep. 2015, pp. 32-35.
Non-Final Office Action dated Jul. 25, 2022 in U.S. Appl. No. 16/798,310.

* cited by examiner

ONLINE TRAINED OBJECT PROPERTY ESTIMATOR

CROSS-REFERENCE TO RELATED APPLICATIONS

This application claims the benefit of the following applications:
[1] U.S. Provisional Patent Application Ser. No. 62/815,153, entitled "Streaming Object Processor", filed on Mar. 7, 2019;
[2] U.S. Provisional Patent Application Ser. No. 62/822,569, entitled "Streaming Object Estimator", filed Mar. 22, 2019;
[3] U.S. Provisional Patent Application Ser. No. 62/827,435, entitled "Hierarchical, Self-Tuning Object Estimator", filed on Apr. 1, 2019;
[4] U.S. Provisional Patent Application Ser. No. 62/857,573, entitled "Online Trained Object Estimator", filed on Jun. 5, 2019;
[5] U.S. Provisional Patent Application Ser. No. 62/868,756, entitled "Graphic Pattern Based Authentication", filed on Jun. 28, 2019;
[6] U.S. Provisional Patent Application Ser. No. 62/871,096, entitled "Graphic Pattern Based Passcode Generation and Authentication", filed on Jul. 6, 2019;
[7] U.S. Provisional Patent Application Ser. No. 62/876,087, entitled "Graphic Pattern Based User Passcode Generation and Authentication", filed on Jul. 19, 2019.
This application is related to U.S. patent application Ser. No. 16/798,310, entitled "Online Trained Object Property Estimator" and filed on Feb. 22, 2020. All preceding applications are incorporated by reference herein in their entireties.

BACKGROUND

Technical Field

This disclosure pertains to the field of processing digital representations of various phenomena, particularly to estimating unknown components of vector representations of streaming objects.

Descriptions of the Related Art

Conventional machine learning (ML) and artificial intelligence (AI) systems operate in two phases: (1) training and (2) running the algorithms and/or the models. Training here refers to controlled forming and testing of the ML models and AI algorithms, that are intended to be used subsequently for operational purposes, e.g. classification or detection of objects appearing on certain media. Often, the training phase in particular is procedurally and computationally complex and slow, such that it cannot be performed in realtime or 'online', e.g., for streaming objects. However, in many cases there is a need to adapt the models and algorithms, e.g. based on the potentially changing characteristics, qualities, properties or attributes existent with or applied to the objects, while the system is processing its production workloads. There thus is a need for innovations enabling to perform both the training as well as running of the ML and AI systems in realtime, e.g., in estimating properties of streaming objects.

SUMMARY

This specification describes aspects and embodiments of a self-tuning online estimator technology, referred to as an estimator. An embodiment of such an estimator performs auto-adaptive pattern matching between feature vectors of received objects and object models, where the object models have their associated values for the attributes (Y-variables) of the objects that the estimator is to predict, based on the values of one or more of the objects' other characteristics (X-variables). When receiving object vectors with pre-populated values for the Y-variables, the estimator will also appropriately update its array of object models, with an objective of maintaining continuously augmented and/or refined object model X-variable vectors, against which the X-variable vectors of the received objects are compared, in order to identify the closest matching object models for the received objects, and accordingly, the most likely values for the Y-variables of the received objects. Further, in certain system configurations, the estimator logic modules per this description are assembled in two or more stages, to operate in a hierarchical arrangement, where an upper-stage estimator seeks to identify the most appropriate lower-stage estimator, or the most appropriate sub-space for lower-stage estimation, for any given incoming object based on upper-stage estimation (e.g. top level categorization) of the given incoming object, and so forth down the chain of estimator stages, until the given object is estimated down to appropriate level of detail. In at least some of such arrangements, the identification of an appropriate lower-stage estimator involves activating the relevant bank of model objects, from a collection of such banks, according to the upper stage categorization of the given object.

In certain arrangements, the estimator logic according this specification provides its most likely estimate(s) of the Y-variable values of the received and estimated object vectors to a consuming process interacting with a human user, e.g. an online visitor of a website, who is also provided all the relevant possible estimate values for comparison, and that human user identifies the optimal estimate value (e.g. most well suited interaction by an automatic web customer service agent), which human-identified best estimate will be the training value for the given Y-variable of the corresponding object (e.g. a vector of variables concerning the online session). In other arrangements, the actual value of the estimated Y-variables of the objects is ascertained in an automated manner, without active human involvement; for instance, where the estimator is configured to predict the next action taken by a website visitor, the estimated next action is compared with the actual next action taken by the user by a monitoring software and/or hardware logic of the consumer of the estimates. Some arrangement yet will involve combinations of human interaction and automation at the consumer of the estimates.

In a more general sense, a consumer of the estimated objects from an embodiment of the estimator can be a software and/or hardware implemented function that may interact with a human user to collect user experience feedback, and such a consumer will perform a post-facto estimation for the objects, and feedback-connect to the estimator logic at least some of the falsely estimated objects as training objects with the in-practice ascertained actual values inserted for the to-be-estimated i.e., typically, the Y-variable(s). In various embodiments, there can be configured threshold values for the estimate error levels (compared with the corresponding, ascertained actual values), or other configurable criteria, for the consumer to deem a given estimated object as falsely estimated, so that it will be fed back to the estimator logic as a training object with the ascertained actual value(s) inserted for its Y variable(s).

An aspect of the present disclosure includes a method, implemented using hardware and/or software logic executing via processing circuitry, for intelligently populating missing values in streaming rows of variables. Embodiments of such a method involve steps of: (a) receiving objects as rows of variables, the variables representing their respective object attribute values as numbers, and (b) in case a given received object has all its variables populated with valid values, in which case the given object is referred to as a training object, keeping a record of a model corresponding to such training object on a non-transitory digital memory referred to as a model array used to hold a collection of object models based on received training objects, and at least in other cases, (i) forming a subset of such received object variables that are populated with valid values, (ii) identifying, from the model array, a set of closest matching models for the given received object based at least in part on a measure of differences between values of such subset of variables of the given received object and of the object models in the array, and (iii) producing a value for at least one such a variable of the given received object that was not, as received, populated with a valid value, based at least in part on values for such a variable among the set of closest matching models. In at least some embodiments of such a method, the step of keeping involves, in case the model array already includes an object model corresponding to the given training object, updating that object model variable values at least in part based on respective values of that training object, and otherwise, creating a new object model in the array based on variable values of that training object, where the model array is considered to include a model corresponding to a given training object in case a vector distance measure between that given training object and any of the existing object models in the array is below a configured threshold distance. Further still, at least in certain embodiments of the method, the produced values for the as-received unpopulated object variables are populated on the outgoing rows from the logic implementing this method, and are connected as such populated rows, or with other identification of the object they relate to, to a consumer of such estimated values for the initially missing values for the stream of rows, such that, the consuming agent, besides otherwise operating on the estimated values and/or fully populated object records, provides tuning feedback to the method. Such feedback, according to at least some embodiments, involves the consumer agent sending back to the logic module performing the method training objects based on cases of output objects from the method that had inaccurate or false values populated for one or more of the initially missing variables, as well as via accumulating an accuracy score metric for the method, which is used to adjust the adaptiveness of the method to potentially changing inter-variable dependencies of the object rows, via increasing or decreasing the level of adaptivity of the models and the unpopulated variable estimation algorithm parameters of the method, when processing training objects, according to decreasing or increasing of the accuracy score, respectively.

Moreover, an aspect of the present disclosure includes a system for estimating values of unknown features of a stream of objects, where the objects are represented as digital feature vectors that include X-variables whose values are populated, i.e., are present with a valid value, on the vectors before the estimating, as well as at least one Y-variable whose values the estimating is to populate, i.e., fill in with an information carrying value, for the objects. Embodiments of such a system, implemented by a digital logic module referred to as an estimator, include: (a) a submodule for maintaining, on a non-transitory digital memory, an array of models for the objects, the array addressed and accessible using Y-variable values of the models, with an object model allocated in the array based upon receiving, among the series, an object that has a such a value pre-populated for the Y-variable for which value there previously was no model in the array, where such allocating of a new model in the array involves storing in the array, as an element at an array position corresponding to that pre-populated Y-variable, the received X-variable values of the received object, (b) a submodule for flagging, among the stream, any such an object, which has its Y variable value pre-populated with a value for the Y-variable for which a model already exists in the array, to be processed as a training object, which involves, updating, in the object model array, the model corresponding to the Y-variable value of the training object by updating the X-variable values of the model according to a weighted average of the respective pre-updating value of the model and the respective value of the training object, and (c) a submodule for computing a Y-variable estimate for a given object in the received stream, through identifying from the object model array, for the given object a set of its closest matching object models along with its associated Y-variable value, based on a measure of the X-variable vector distances between the given object and the object models of the array, with that associated Y-variable value referred to as the Y-variable estimate for the given object.

Various further embodiments of such a system include various combinations of further elements and features such as: (d) a submodule for producing the given object as an output from the estimator, with the Y-variable estimate value populated on its feature vector component designated for the Y-variable, (e) a submodule for forming a set of synthesized variables for the objects based at least in part on values of their X-variables as received, where the X-variables used by the submodule for computing the Y-variable estimate include both the received X-variables as well as the synthesized variables, (f) a submodule for generating subsets from the object X-variables, including the received and synthesized ones, with each such subset referred to as an object variant, where the logic function of identifying is replicated for each of such object variants, and where the computing of the Y-variable estimate for the given object is done based at least in part on the values of the Y-variable estimates of one or more of the variants and respective accuracy rankings of such variants, (g) a feature whereby the processing as a training object further involves adjusting, by the estimator, the accuracy rankings of the variants by improving or degrading such a ranking of a given variant according to (a) a degree of match between the Y-variable estimate of the given variant and the pre-populated Y-variable value of the given training object and (b) a measure of a relative frequency of occurrences that the Y-variable estimate of the given variant has been (i) among a configured number of closest Y-variable estimates of the variants compared with such pre-populated Y-variable value or (ii) within a defined range of difference from that pre-populated Y-variable value, and/or (h) a hardware and/or software logic based consumer agent for processing estimated objects produced by the estimator, such a consumer subsystem including (i) a module for ascertaining an actual value corresponding with a given estimate of a Y-variable of its respective estimated object, (ii) a module for determining whether the given estimate is a false or a correct estimate through comparing the estimate with the actual value, and (iii) a module that, in response to determining the given estimate to be a false estimate, produces a training object from that estimated object at least in part by replacing the given estimate of the Y-variable with the corresponding ascertained actual value, and sending that training object back as an input to the estimator. Yet, in certain embodiments, the consumer subsystem further includes: (iv) a module for keeping an accuracy score for the estimator based on a frequency measure of correct as opposed to false estimates among at least some of the estimates produced, and (v) a module for providing control for the estimator to set an appropriate adjustment level of the updating of the X-variable values of existing object models based on the corresponding differing variable values of new received training objects so that, in response to increase of the accuracy score, the adjustment level is decreased, while in response to decrease of the accuracy score, the adjustment level is increased.

Moreover, hierarchical system configurations include a set-up incorporating a higher-level e.g. a primary estimator and a collection of lower-level e.g. secondary estimators, with each of the secondary estimators having its own specific array of object models, where the respective Y-value estimate produced by the primary estimator for a given received object is used for selecting an appropriate one of the secondary estimators for performing finer-grade estimating of the unknown variable value(s) for the given object, based on comparison of the X-variable values of the object with those of the models specific to such selected secondary estimator. Yet another hierarchical system configuration involves two of the estimators connected in a chain, where the array of models of the latter i.e. lower-stage estimator includes a collection of object model banks, and the respective Y-variable estimate produced by the former i.e. upper-stage estimator is used for selecting an appropriate model bank from the collection as the array of models to be used by the submodules of the latter estimator for identifying the closest object models for the given received object.

Furthermore, an aspect of the present disclosure involves a method for estimating values of unknown features of a stream of objects, the objects represented as digital feature vectors that include X-variables whose values are populated on the vectors before the estimating as well as a Y-variable whose values the estimating is to produce for the objects. An embodiment of such a method, performed by a system referred to as an estimator that comprises hardware logic and/or software logic executing via processing circuitry, includes steps as follows: (a) maintaining, on a non-transitory digital memory, an array of models for the objects, the array indexed according to Y-variable values of the models, with a model allocated in the array based upon receiving, among the stream, an object that has a such a value pre-populated for the Y-variable for which value there previously was no model in the array, where such allocating of a new model in the array involves storing in the array, as an element at the array index corresponding to such pre-populated Y-variable, the received X-variable values of the received object, (b) processing as a training object any such an object in the stream that has its Y variable value pre-populated with a value for the Y-variable for which a model already exists in the array, where the training object processing involves, updating, in the array, the model corresponding to the Y-variable value of the training object by equating the X-variable values of the model to updated values computed as a weighted average of the respective pre-updating value of the model and the respective value of the training object, and (c) computing a Y-variable estimate for a given received object, through identifying from the array, a set of at least one of its closest matching models along with its associated Y-variable value, based on a vector distance measure between the X-variables values of the given received object and of the model objects in the array, with such associated Y-variable value referred to as the Y-variable estimate of the given object.

Various further embodiments of such a method include various combinations of further steps and features such as: (d) a step of producing the given object as an output from the estimator, with the Y-variable estimate value filled in on its feature vector component designated for the Y-variable, (e) a step of forming a set of synthesized variables for the objects based at least in part on values of their X-variables as received, where the X-variables in the step of computing the Y-variable estimate include both such received X-variables as well as the synthesized variables, (f) a step of generating subsets of the received as well as synthesized X-variables of a given object, with each such subset referred to as an object variant, where the procedure of identifying is done for each of such object variants, and where the step of computing the Y-variable estimate for the received object is done based at least in part on the Y-variable estimates values of one or more of the variants and their respective accuracy rankings, (g) a feature whereby the processing as a training object further involves adjusting, by the estimator, the accuracy rankings of the variants by improving or degrading the ranking of a given variant at least in part according to (a) a degree of match between the Y-variable estimate of the given variant and the pre-populated Y-variable value of the given training object and (b) an accumulated measure of frequency of occurrences that the Y-variable estimate of the given variant has been (i) among a defined number of closest Y-variable estimates of the variants compared with the pre-populated Y-variable value or (ii) within a defined range of error from the pre-populated Y-variable value.

Yet further embodiments of the method involve object processing by a consumer agent for the estimates produced by the estimator, where the consumer agent, implemented by hardware logic and/or software logic executing via processing circuitry, performs functions as follows: (i) ascertaining an actual value corresponding with a given estimate of a Y-variable of an estimated object, (ii) determining whether that given estimate is a materially false or a correct estimate through comparing the estimate with the actual value, and (ii) in response to determining the given estimate to be materially false, producing a training object from that estimated object at least in part by replacing the given estimate of the Y-variable with the corresponding ascertained actual value, and sending that training object back as an input to the estimator. Moreover, in certain embodiments of the method, the object processing by the consumer further includes (iii) keeping an accuracy score for the estimator based on a frequency measure of materially correct as opposed to false estimates among the estimates produced, and (iv) providing control for the estimator to set an appropriate adjustment level for the updating of the X-variable values of existing object models based on the corresponding differing variable values of new received training objects so that, in response to increase of the accuracy score, the adjustment level is decreased, while in response to decrease of the accuracy score, the adjustment level is increased.

An aspect of the present disclosure involves a mechanism for charging, and crediting back, a user application of the object property estimation function per the Detailed Description that follows, and as summarized above, according to quality of unknown property estimates produced by such a function, referred to as the estimator. According to an embodiment of such a charge and credit-back mechanism, the user application that uses the estimator for predicting unknown properties for its stream of objects will be charged, in some currency, which can but does not need to be monetary, for its usage of the given estimator instance, including, via an incremental charge per each estimate for an object property produced by the estimator. In at least some of such embodiments, however, the net charges for the estimator usage will be calculated by reducing, from gross charges worth the sum of the estimate values produced for the user application, based on training objects sent as feedback from a consuming agent of the user application to the estimator. For instance, in a given example embodiment, the net charges for the user application for its estimator usage, for a given time period, are calculated as follows:

$$\text{MAX }[0, (\text{unit charge per each estimate produced to the user–accuracy score delta of each training object fed back to the estimator})],$$

where the accuracy score delta corresponds to a present decrement or an increment of an accuracy score for the estimator, while the unit charge represents the unit for both the gross charges for estimator usage, as well as for the credits applied as a reduction of charges due to the training objects fed back to the estimator. In an illustrative use case example of the estimator producing binary classification (positive or negative) for objects streamed through it by a user application, the accuracy score delta for a training object generated by the user application based on a correct classification (either true positive or true negative) of a given estimated object could be worth the unit charge, i.e., +1, while a false positive classification could result in accuracy score delta of −5, and a false negative, an accuracy score delta of −50. It shall be appreciated, including for the reasons elaborated in the Detailed Description, that the charging and crediting mechanism per above will align the operational incentives of both the estimator service provider (i.e. the charging party) as well as the operator of the user application toward providing the estimator realistic feedback, via training object generation, regarding the accuracy of the estimates produced, with respect to the corresponding user-application ascertained values for the estimated properties of the objects streamed through the estimator.

An aspect of the present disclosure further involves techniques and mechanisms for fast and efficient hardware logic based computations, including multiplications and divisions, for systems and methods per the following detail description, and as summarized above.

Embodiments for such fast, single-clock-cycle, division computation involve forming a synthesized variable approximating the ratio between a defined pair of X variables, e.g., X1 divided by X2. According to at least certain embodiments, such an approximate ratio is computed using combinatorial hardware logic so that the logic will produce the appropriate power-of-two multiples of X2 (e.g., in case the ranges for X1 and X2 are within 0 . . . 254, the X2 variable multiplied by 2, 4, 8, 16, 32, 64, 128 and 256) and identify from such multiples of X2 the one that is closest to X1, and use the corresponding multiplier as the value of the synthesized predictor variable used to approximate the ratio X1:X2. For example, in case that X1=140, and X2=31, the power-of-two multiplier for X2 getting closest to X1 is 4 (31*4=124, closer to 140 than the next closest alternatives of 31*2, or 31*8), and, consequently, this same-clock-cycle approximated value of X1:X2 is 4. In an embodiment, the unknown variable estimation logic is configured to form such a synthesized variable through usage of a pair of configurable registers whose contents respectively identify the dividend and divisor variables among the received X variables of the object, for their quotient to be approximated via a synthesized predictor variable computed per above.

Further, embodiments for the fast, single-clock-cycle, multiplication computations involve forming a synthesized variable approximating the product of a defined pair of the X-variables, e.g. X1 and X2, of received streaming object feature vectors. Such a product of two variables, in case each is mapped to the range of 0 . . . 255, can, according to certain embodiments, be looked up from a 64*1024-deep table, where the address to such a look-up-table (LUT) is the concatenation of the binary value of X1 and X2, and the data value at each given LUT address is the pre-computed product for the corresponding concatenated X1, X2 pair on the address bus. However, such a product, in the range of 0 . . . 64516, can be divided (rounding down) into 252 subranges each covering 256 consecutive values ([0,255], [256,511], [512,767], . . . [64256,64511]), and, at least in some embodiments, to approximate the product of two [0,255] variables, a concatenation of the four most significant bits (MSBs) of the X-variables is used as an address key to a 252-deep LUT storing the approximate product values for the pairs of X-variables corresponding to respective pairs of MSB values of the multiplicands, with these LUT-stored approximate product values corresponding to mid-point values in their respective ranges, e.g., for the subrange [512,767], a possible mid-point approximation of the product could be (512+767)/2=640. Further, for improved accuracy of such approximation, according to certain embodiments, the LUT address, with which the approximation of the product is to be looked up, is incremented by one for each case that the $4^{th}$ MSB of one of the X-variables, and the $5^{th}$ bit of the other one of X-variables being multiplied, being both '1'. In an example implementation of such an approximation, while the LUT will hold at its address formed by concatenation of the 4 MSBs of the X-variables being multiplied (denoted by X1[7:4],X2[7:4]) the pre-computed product of X1[7:4] and X2[7:4]), the LUT address line value will be (X1[7:4],X2[7:4])+X1[5]*X2[4]+X2[5]*X1[4], where the product operator '*' for the $5^{th}$ and $4^{th}$ bits naturally can be implemented by the logic AND function of these bits.

Moreover, embodiments for same-clock-cycle weighted average computation between two variables can utilize an approximation mechanism such that an adjustable weight for the desired one of the pair of variables (referred to as X1) is allowed to take a value from an applicable set of power-of-two values less 1, e.g., 2 into the power of 3 to 10 minus 1, for a range of 7, 15, 31, 63, 127, 255, 511 and 1023. An illustrative use case for such a weighted average computation, for an assumed active weight value from such range of 63, is such that a new value (referred to as X2) for a given quantity will impact the updated value of such a quantity, e.g. a weighted moving average for an X-variable value of an object model, by 1 part while the existing value (X1) will impact by 63. According to at least certain embodiments, such an updated value is computed using a formula as follows:

$$[X2+(64*X1)-X1]/64,$$

where the multiplication of X1 by 64(=2^6) is done in the hardware logic by adding 6 trailing '0' bits to the end of the variable X1 value, i.e., doing a shift-left operation of the binary value of X1 by 6 bits, and where the division by 64 is done, conversely, by shifting the result of X2+(64*X1)−X1 to right by 6 bits, i.e., such that the trailing 6 bits of the dividend of the above formula are eliminated, to form the approximate value for this weighted average. According to at least some of such embodiments though, the finalized weighted average value will be incremented by 1, in case the most significant bit of the eliminated trailing bits was '1'. In the general case of this example, approximating such an adjustable weighted average, for an active weight value of 2^N−1, will naturally apply the shift-left and shift-right operations per above by N bits.

It shall be appreciated that, using the above described techniques, any and all of the multiplication and division computations per above are straightforwardly implemented in combinational hardware logic, such that produces the computation results by the end of the present logic clock cycle. Thereby, e.g. synthesized X-variable values, for instance those approximating the ratio of certain two independent, received X-variables of an object feature vector, can be formed on the same hardware logic clock cycle as the original X-variable values were received as inputs to the hardware logic system used to predict the values of the unknown (Y) variable values of the streaming object feature vectors. Accordingly, for example, the original independent X-variables of the incoming object feature vectors can be augmented by appending to such received feature vector components a desired collection of synthesized feature components computed e.g. as approximated ratios of defined pairs of the original received X-variables, such that values for the Y-variables of the object feature vectors can be estimated based on combinations of such augmented collection of X variables, including both the received as well as synthesized X feature values.

In one aspect, a system is described for estimating values of unknown features of a series of objects, the objects being represented as digital feature vectors, each digital feature vector including a number of X-variables having corresponding values populated on the respective digital feature vector before the estimating and, for at least a portion of the series of objects, a Y-variable having an unknown value prior to the estimating. The system may include an array of models for the series of objects, maintained on a non-transitory digital memory, where each model of the array of models includes a Y-variable value and a number of X-variable values corresponding to the respective Y-variable value. The array of models may be indexed according to the Y-variable values of the models. The system may include an estimator module configured as a number of submodules, each submodule including hardware logic and/or software logic executing via processing circuitry. The number of submodules may include a submodule for determining, for each object of the series of objects, an estimated value of the Y-variable of the digital feature vector of the respective object by identifying, from the array of models, at least one closest matching model by computing, for each model of at least a portion of the array of models, and for each X-variable of the digital feature vector of the respective object, a calculation of a distance between the X-variable of the digital feature vector and a corresponding X-variable value of the respective model, using the distances for the respective model, a calculation of an aggregate distance between the values of the X-variables of the respective object and the X-variable values of the respective model, and identifying the at least one closest matching model of the array of models as having a shortest distance of the aggregate distances of the array of models, and forming the estimated value of the Y-variable of the respective object based at least in part on a Y-variable value of the at least one closest matching model. Calculating the aggregate distance may include performing non power-of-two based division or multiplication computations on a floating point microprocessor. The system may include a submodule for transmitting an output object comprising the estimated value.

In one aspect, a method is described for estimating values of unknown features of a series of objects, the objects being represented as digital feature vectors, each digital feature vector including a number of X-variables having values populated on corresponding components of the respective digital feature vector before the estimating and, for at least a portion of the series of objects, a Y-variable having an unknown value prior to the estimating. The method may include operations performed by hardware logic and/or software logic executing via processing circuitry. The operations may include maintaining, on a non-transitory digital memory, an array of models for the series of objects, where each model of the array of models includes a Y-variable value and a number of X-variable values corresponding to the respective Y-variable value, and the array of models is organized according to the Y-variable values of the models. The method may include, for each object of the series of objects, computing an estimated value of the Y-variable of the respective object by identifying, from the array of models, at least one closest matching model based on a measure of difference between the values of the X-variables of the respective object and at least a portion of the X-variable values of at least a portion of the models of the array of models, forming the estimated value of the Y-variable of the respective object based at least in part on a Y-variable value of the at least one closest matching model, and transmitting the respective object as an output object, where a value of the Y-variable of the digital feature vector of the output object the estimated value, and incrementing, for each output object of at least a portion of the output objects, a net charge to a consumer of the output objects. The method may include receiving, from the consumer of the output objects for at least one of the output objects, feedback information comprising at least one of a) accuracy information regarding accuracy of estimations, or b) a training object generated by the consumer due to a difference, identified by the consumer, in an actual value in comparison to the estimated value, applying the feedback information to train at least one model of the array of models, and responsive to the receiving, decrementing the net charge to credit the consumer for providing information useful in training the array of models.

BRIEF DESCRIPTION OF THE DRAWINGS

The drawings and tables (collectively, diagrams), which are incorporated in and constitute a part of the specification, illustrate one or more embodiments and, together with the description, explain these embodiments. Any values and dimensions illustrated in the diagrams are for illustration purposes only and may or may not represent actual or preferred values or dimensions. Where applicable, some features of embodiments may be omitted from the drawings to assist in focusing the diagrams to the features being illustrated. In the drawings.

Figure 1:
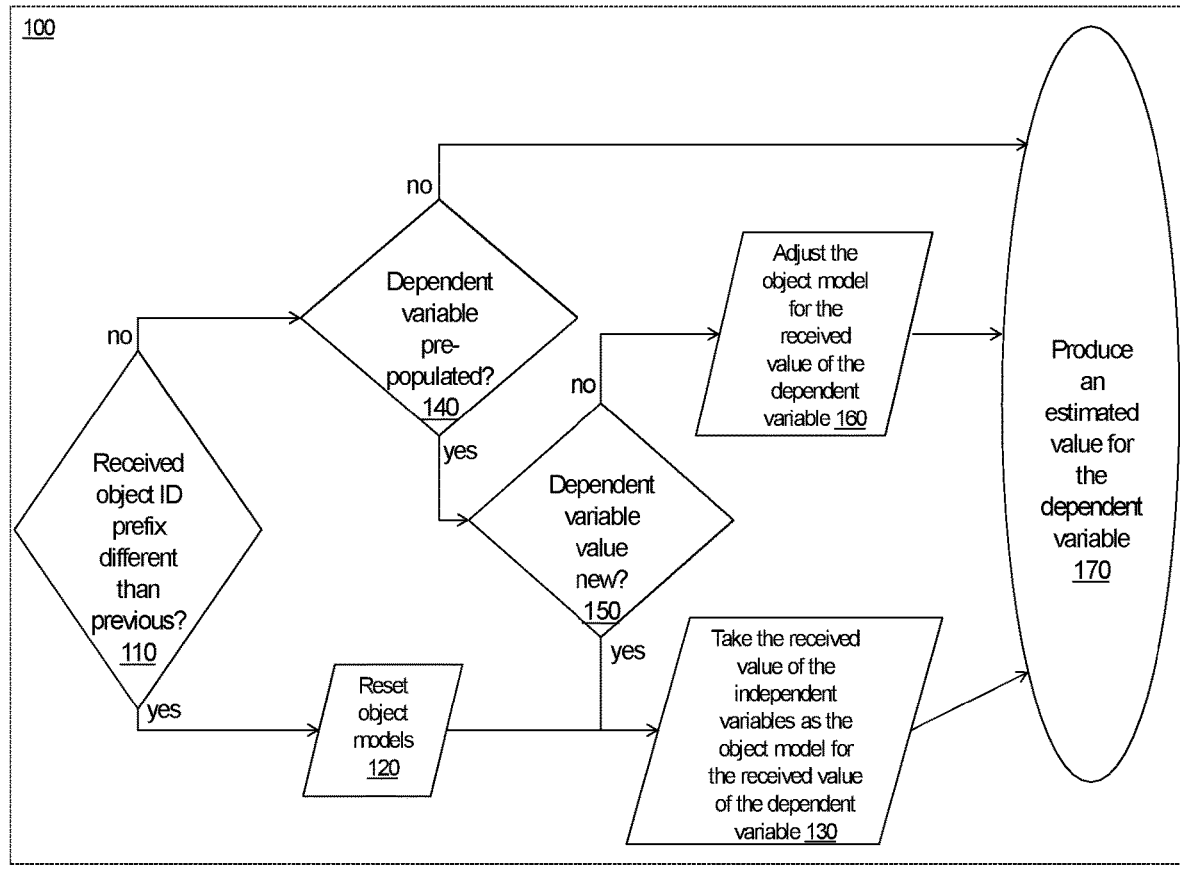
FIG. 1 is a flow chart of a process for estimating an unknown variable for a received object feature vector, according to an embodiment of an object estimator.

General symbols and notations used in the drawings:
- Boxes indicate a functional module comprising digital logic.
- A dotted line box may be used to mark a group of drawn elements that form a logical entity.
- Arrows indicate a digital signal flow. A signal flow may include one or more parallel bit wires. The direction of an arrow indicates the direction of primary flow of information associated with it with regards to discussion of the system functionality herein, but does not preclude information flow also in the opposite direction. A gapped arrow indicates a control, rather than primary data, flow.
- An arrow reaching to a border of a hierarchical module indicate connectivity of the associated information to/from all sub-modules of the hierarchical module.
- Lines or arrows crossing in the drawings are decoupled unless otherwise marked.
- For clarity of the drawings, generally present signals for typical digital logic operation, such as clock signals, or enable, address and data bit components of write or read access buses, are not shown in the drawings.

The drawing element reference numerals, e.g., estimator (100), are in the detail description that follows placed in parentheses to make it clear when a number refers to a drawing element, rather than to its numeric value.

DETAILED DESCRIPTION

The description set forth below in connection with the drawings and tables (diagrams) is intended to be a description of various, illustrative embodiments of the disclosed subject matter. Specific features and functionalities are described in connection with each illustrative embodiment; however, it will be apparent to those skilled in the art that the various embodiments may be practiced without each of those specific features and functionalities, as well as with modifications thereof.

An embodiment of the self-tuning online estimator technology operates as follows:

1. Object Characterization and Pre-Processing

Various forms of phenomena, artifacts, processes, conditions, events etc. (commonly, objects) are characterized via a set of digital variables, e.g. quantitative metrics and/or qualitative characterizations, all cast to numeric representations within the defined value ranges (e.g. [0,254]).

Note that qualitative variables whose native values (e.g., a type of a printed publication, such a book, academic journal, newspaper or magazine article etc.) do not have direct, quantifiable relation to others are to be represented by a vector of component values, where each component corresponds to one of the available types for the qualitative variable, and the value for such vector components is used to indicate whether and/or how much the type of the given object instance matches the type represented by the given component. For instance, if the value of the given qualitative variable indicating the type of a printed publication was "academic journal article", and the other available types were "book", and "newspaper or magazine article", the associated object could have the value of its variable "academic journal article" set to a positive value, e.g. near the mid-point of the supported value range, while values of the variables "book" and "newspaper or magazine article" could be 0's.

In certain scenarios, the object feature vector components representing the individual value possibilities of a given qualitative variable can express respective degrees to which the associated property of the given object corresponds with the respective qualitative values represented by such vector components. For a simple example, in case an object had a feature for its color, which had possible values of the primary colors of "red", "yellow" and "blue", a green object could have the associated feature vector components at mid-range values for the "yellow" and the "blue", and at 0 for the "red" component, given that green color is made half-and-half of the primary colors yellow and blue. Similar principles can be applied to various further scenarios of representing object characteristics that are natively qualitative via digital feature vector component values.

Also, the values of the natively quantitative variables are scaled up or down, and/or truncated, for the representation in the supported value range (e.g., 0, 1, . . . 254) for this vector representation of the objects.

Besides observed or controlled variables (e.g., temperature), referred to as independent or X-variables, the objects can be characterized with one or more result or respondent variables, referred to as dependent or Y-variables, whose values, at least in theory, could be estimated from the observed values of the independent variables. Note that the terms independent variables and dependent variables are not to be understood here in a strict sense; in reality, there can be dependencies among also what are referred to as the independent variables, as well as it could turn out that what was thought of as variable dependent from a given set of independent variables in reality has little dependency from such set. The main idea is that the estimator will seek to estimate what are referred to as the dependent variables from the what are referred to as the independent variables, where the values of the independent variables are typically relatively straightforward to obtain for the given object, while the values of dependent variables of real world occurrences of the objects will be verifiable only afterwards such that their estimated values have practical utility, and the more so the faster and with higher accuracy the estimates are produced.

As a result of the characterization per above, each object is represented by its feature vector of values for the defined set of independent variables. In addition, the characterized objects are typically further tagged with an identifier or "ID" (identifying the particular object instance). A sequence of ID-tagged and characterized objects can form a set or a stream of objects. Where such objects have their dependent variables pre-populated with the actual values, such objects (referred to as training objects) can be used for training the estimator, in particular, tuning the object models and estimation algorithm parameters of the estimator logic. This form of self-tuning online estimator will use such continuously trained estimation logic for estimating the dependent variables of objects also in the ongoing stream of objects being presented to the estimator.

Table 1 below provides an example of objects that could be provided as an input to the self-tuning online estimator, according to an embodiment.

TABLE 1

Example of input objects.

| Tag | | I/O | Independent variables | | | | | Dependent variables (max. value 255 is reserved for denoting a non-populated value) | |
|---|---|---|---|---|---|---|---|---|---|
| Prefix | Serial # | I/O | X1 | X2 | X3 | X4 | X5 | Y1 | Y2 |
| 8 | 8667 | 0 | 0 | 0 | 41 | 211 | 255 | 255 | 71 |
| 8 | 8668 | 0 | 254 | 7 | 127 | 0 | 255 | 255 | 255 |
| 255 | 0 | 0 | 15 | 242 | 0 | 127 | 171 | 155 | 31 |
| 255 | 1 | 0 | 91 | 30 | 127 | 0 | 255 | 191 | 12 |

2. Object Schema and Object Models Initialization

To receive a sequence of characterized objects per above, the estimator is configured with a schema and range for the objects, which typically include identification of the independent and dependent variable positions in an object feature vector, e.g., when an object is presented as a row vector of variable values, the independent variables as occupying a defined number of the leftmost of such value positions, and the dependent variable(s) as the rest of the positions in the vector, along with the value ranges for the variables. For instance, the estimator could be configured to support objects including up to 16 independent and up to 3 dependent variables, all in the range of 0 through 254 (which range of value representations can be cast back to the respective real quantitative and/or qualitative values for each given variable). In a configurable hardware logic, e.g. an FPGA chip, based embodiment, the configuration per above can be done via designing the hardware logic for the estimator. In alternative embodiments, this configuration can be done via setting appropriate values of software configurable parameters for the estimator, e.g., using a microprocessor to write values that define the object schema in device configuration registers of the estimator hardware logic.

The object ID tags can be defined to include user, application or object schema specific prefixes such that when the estimator receives an object with the ID prefix value different than with the previous object, the estimator will reset its object models (e.g., such that each of the object models corresponding to one of the possible values of the given dependent variable have their independent variable values reset to mid-point in the respective value range; for instance to value 127 in case of variable value range of 0 . . . 254).

The I/O bitfield in the tag of an object is used to denote whether the object has been processed by the estimator. In case the I/O field is a single bit, its value indicates whether the object is unprocessed (e.g., I/O bit='0', indicating an input object) or processed by the estimator logic (e.g., I/O bit='1', indicating an output object). In addition to such a single I/O bit, the I/O field can include bits individually for each of the X-variables, which, while inactive ('0') for input objects, the estimator logic will activate (e.g., flip from '0' to '1') for such corresponding X-variables that were missing in a given input object (i.e. X-variables that had a reserved value, (e.g. 255, instead of a valid value) but which the estimator produced an estimate for. Similarly, such individual I/O bits can, in certain object schema, be included also for the Y-variables, even though the estimator embodiments discussed herein will normally produce an estimate for each Y-variable; the Y-variable specific I/O bits will however indicate whether the corresponding (in-range i.e. valid) Y-variable value on an output object instance was inserted (e.g., indicated by value '1') by the estimator logic, or simply passed through with its input value (e.g., indicated by value '0'), which could be the case, in some examples, when that input object instance did not have enough valid X-variables for producing the given Y-variables, or when there was no sufficiently close model object vector for the X-variable values of the input object instance, e.g., as described in further detail in section 4 below.

According to embodiments of the estimator logic, when a given object stream does not use all the X-variable components of a given object schema, the unused variable columns (e.g. X5 for the object stream with prefix value 8 in Table 1) will be masked to an invalid value (e.g. 255 to denote that the variable component is not used for the given series of objects); consequently, the object processing logic will ignore such unused X-variable components. This feature will allow flexibly adding, as well as removing, e.g. experimental X-variables in object streams.

3. Object Processing to Produce Variants of Estimates of the Unknown (Dependent) Variables According to an embodiment of the estimator technology (100, FIGS. 1-4) described herein in detail, the dependent variable estimation is done independently, and with alike procedures, for each of the dependent variables to be estimated, for which reason the following discussion assumes that the estimator will estimate only a single dependent variable, referred to as Y1 (see Table 1). The primary procedures involved producing an estimate value for the given dependent variable are illustrated in the flow chart per FIG. 1.

As illustrated in FIG. 1, an initial step in receiving an object feature vector (referred to simply as an object), e.g. per the object schema illustrated in Table 1, is determining (110) whether this received object begins a new object set or stream, based on whether the prefix of the ID tag of the received object differs from that of the most recently received object. The procedures (120, 130) followed in case that newly received object does begin a new sequence of object, including resetting (120) of the object models, were described in section 2 above. The procedures (140, 150, 160) executed for objects received during an ongoing sequence, including actual production (170) of estimate values for the studied dependent variable (Y1), according to an embodiment of the online estimator, involve the following actions:

Upon determining (in step 140) that Y1 for the received object was pre-populated (i.e., it had a valid value, rather than a reserved value e.g., 255), the estimator will see (150) if it is a new value for Y1 (a value not previously received since the latest reset of the object models), and if yes, the estimator takes (130) the values of the independent variables of that object as the present model for the objects of this newly received value of Y1, and if not (i.e. at least one object with that value of the dependent variable has been received since the latest reset), the estimator will adjust (160) its present model for the object of that value for Y1.

The adjustment (160) of the object model for a given pre-populated value of Y1 is done by computing, for each of the independent variables, a weighted average between the value of the variable in the existing model (for the given received value of Y1) and the value of the variable in the received training object. For instance, the weight for the existing model can be 31 and the weight of the received object 1 for this computation of the weighted average values for independent variables of the adjusted object model for the received value of the dependent variable.

Figure 2:
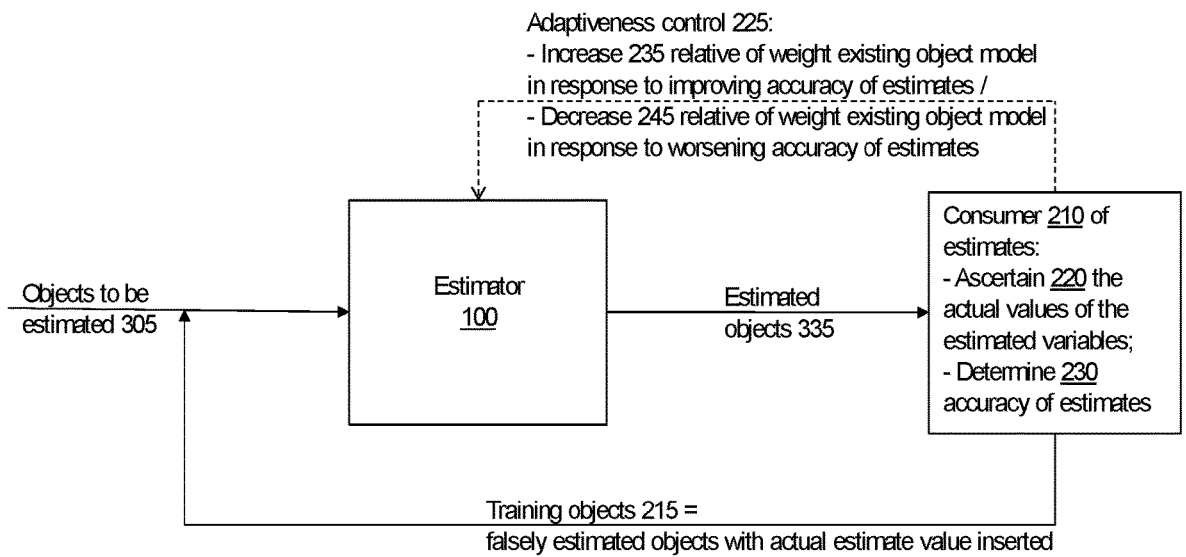
FIG. 2 illustrates feedback loops from a consumer of the estimates from the estimator per FIG. 1. The consumer provides adjustment control regarding how quickly the estimator logic is to adapt to new training object values, as well as selectively provides training objects back to the estimator, with the ascertained correct estimate values pre-populated.

Further, in at least certain embodiments, per FIG. 2, the relative weights of the existing model and the received object (in the example of the above paragraph, 31 and 1, respectively) can be adjustable (225), e.g., such that the relative weight of the existing model will be increased (235) (e.g., from 31 to 63) in response to observed improving accuracy of the estimates (335) produced by the estimator logic (100), and, conversely, the relative weight of the existing model will be decreased (245) (e.g., from 31 to 15) in response to detected (230) reducing accuracy of the estimates produced. For these purposes, the level of accuracy of the estimates (335) produced can be quantified at the consumer (210) of the estimates, through a post-facto comparison of the estimate values with the ascertained actual (or optimal) values, and accordingly the consumer can maintain a running accuracy score for the estimates produced. In some embodiments, such running accuracy scores can be computed as a weighted-average ratio of correct vs. incorrect estimates (assuming a case of a qualitative estimated variable), or as a weighted-average ratio of correctness scores of individual estimates (in case of a quantitative estimate variable). The weighted-average can be computed, e.g., as an average of the existing accuracy score multiplied by a weight of, e.g., 63 (or any other desired weight), and a correctness figure of the present estimate. The correctness figure could be, in case of a qualitative estimate, 0 for incorrect or 1 for correct estimates, and, in case of a quantitative estimate, (an approximation of) a division of the smaller of the estimated and actual values by the greater of them, to reflect the relative closeness of the estimate to the actual value. Such consumer-maintained (230) accuracy score can be, in turn, converted to a corresponding value of the relative weight of the existing model at the estimator (e.g., 1, 3, 7, 15, 31, 63, 127, 255 etc., assuming the weight of the new training object is kept at 1) and such updated relative weight(s) fed back (215) to the estimator logic (100), to be applied when receiving subsequent training objects, as illustrated in FIG. 2. Through such adaptivity of the relative weight of the existing model vs. the received training objects, the estimator logic will be able to intelligently resist unduly changing a well performing object model due to a small number of training objects (that would not be well-representative of the overall population), while being able to update its object models quickly when needed, i.e., in the discussed case, when the given existing model has a falling accuracy performance. These existing vs. received object model weight factor adjusting methods can be implemented independently for each estimated variable.

According to certain embodiments, the consumer (210) keeps the accuracy score for the estimator (100) as follows:

In an illustrative case of the estimator classifying an object, e.g. a feature vector reflecting an online login session's attributes, with the estimator producing an estimate for authenticity of a given login attempt based on such attributes, the accuracy score is incremented or decremented as follows based on ascertained vs. estimated values of the estimated property (e.g. authenticity of a given login candidate) of the object:

TABLE 2

| Accuracy score increment/decrement: | | Ascertained: | |
|---|---|---|---|
| | | unauthentic | authentic |
| Estimated: | unauthentic | +10 | −10 |
| | authentic | −100 | +1 |

Per the example of the above Table 2, for instance in case of the estimator had produced an estimate value (335) corresponding to "unauthentic" for a given input object (representing a login attempt) that was ascertained by the consumer as "authentic", the accuracy score for the estimator is decremented by value 10.

In estimator embodiments as described above, the received training object feature vector values update (160) their respective values of the model object feature vector values per a formula, for each given X-variable component of the object feature vector:

updated model value=[($W$−1)*(existing model value)+(training object value)]/$W$, where W is the present weight of the object model. In such embodiments, via the control information flow (225) in FIG. 2, an increase in the accuracy score, as accumulated by the consumer (300), will be used to increase the coefficient W, and similarly, a decrease in the estimator's accuracy score to decrease the value of W in the above formula. Note that relation between the accuracy score and the existing model weight W need not be 1:1 or linear, but can, for instance, involve a suitable scaling factor as well as non-linearity. For instance, in a certain embodiment, the coefficient W value will be one of the power of two values (e.g., in range $2^2$ to $2^{10}$), and the adjusting logic (160) (FIG. 1) will, after starting from W a value such as $2^6$, be accumulating the net sum of the accuracy score decreases and increases received (225) from the consumer (210), until a defined (negative or positive) threshold value would be reached, and move the value of W to the next power of 2 value based on accumulation of such a threshold's worth of accumulated accuracy score decreases or increases.

Moreover, according to certain embodiments, the user application (e.g. Internet of Things (IoT) application, or an online application) that uses the estimator (100) streaming machine learning engine for predicting unknown properties for its stream of objects (collections of observations of a given system, process, etc.) will be charged (in some currency, which does not need to be monetary) for usage of the given estimator instance, including, via an incremental charge per each estimate 335 for an object property produced (170) by the estimator (335). However, in at least some of such embodiments, the net charges for the estimator usage will be reduced, from the total charges that is simply the sum of the estimate values produced to the consumer (210), by having the consumer to feedback (215) training objects to the estimator (100). For instance, in a given example embodiment, the net charges for the user application for estimator usage, for a given period, are calculated as follows:

unit charge per each estimate delivered to the consumer–accuracy score delta of each training object fed back to the estimator, where the accuracy score delta corresponds to the numbers per Table 2, representing a decrement or increment of the accuracy score for the estimator, while the unit charge represents the unit for both the charges for estimator usage as well as for the credits applied as a reduction of charges, due to the training objects fed back to the estimator. Such net charges for the estimator usage will normally be prevented from becoming negative, e.g., such that the maximum credits that can be applied will be equal to the gross charges.

Note that the charging and crediting system per above aligns the operational incentives of both the estimator service provider (i.e. the charging party) as well as the user (e.g. an IoT system operator) of the estimator toward providing the estimator neutral, truthful and balanced feedback (215) of the accuracy (or generally, quality) of the estimates (335) with respect to the corresponding consumer (210) ascertained values for the estimated properties of the objects streamed through the estimator (100). These incentives include:

For the user (operating the consumer (210)):
i. Improved cost-efficiency, due to credit applied toward the charges, per each training object fed back (215) to the estimator.
ii. Improving quality of the estimates, due to the self-tuning by the estimator per the training object values (object model updating, and estimation algorithm parameter tuning).
iii. Note also that it would be counterproductive for the user to seek to maximize its credits (minimize net charges) by seeking to feed back to the estimator an unbalanced mix of training objects, e.g., through over-emphasizing the falsely classified objects among the training object—for the example shown in Table 2, this scenario would involve the consumer feeding back to the estimator an unrealistically high concentration of false positives (supposed cases of the estimator having classified unauthentic login candidates as authentic), in order to gain 100 credit points per each such training object, which would be worth the estimator charges for 100 true positives (authentic login candidates classified by the estimator as authentic). The reasons why the user is actually disincentivized against providing such misleading (rather than realistic) feedback (215) to the estimator, e.g. via training objects that bear false values on their Y-variables (which would yield high credit to the user), include that such invalid training objects could distort the object models and/or the algorithm tuning parameters used by the estimator for its property prediction function (e.g., login candidate authenticity estimation), such that, even if the user would be able to reduce its net charges for the estimator usage through providing a disproportionate concentration of high-credit (falsely estimated) training objects, this would come at the expense of loss reliability of the estimates produced. Naturally, the primary objective for using the estimator service is for the user to gain reliable, high quality estimates for unknown properties of the objects in the user's system, and, as such, seeking credit maximization would not be worthwhile for the user, as it would come at the expense of the user's primary objective.
iv. Reliability of the estimates (335) received, with the knowledge that incorrect estimates (e.g., per Table 2, each case of an unauthentic login attempts classified as authentic, and an authentic login attempts classified as unauthentic, would cost the estimator service provider significantly in credits, worth the reversal of charges from 100 and 10 correct classifications of authentic and unauthentic login attempts, respectively). That is, the user of the estimator knows that the estimator service provider will certainly care about the quality of the estimates. Naturally, the parameters in Table 2 are just an example to illustrate the concept, and the actual parameter values, and their conversion rates to any monetary figures (e.g., $0.001 per unit of charge or credit), are to be negotiated and agreed between the estimator service provider and the user.

For the estimator service provider, operating the estimator (100):
i. Due to the point above, the estimator service is better positioned for user acceptance and adoption, since the user knows that the estimator service provider can accept responsibility for incorrect estimates, and is highly incentivized to produce correct estimates (335) to the consumer (210).
ii. Improving the quality of the estimates, due to the self-tuning by the estimator per the training object values (e.g., object model updating and estimation algorithm parameter tuning), and thereby, improving user satisfaction with the service, which makes a certain amount of credit-back to the user providing realistic feedback of the estimator worthwhile for the estimator operator.
iii. The improving the quality of the estimates will reduce the frequency of incorrect estimates, for which the user can claim back credits (e.g., examples of per Table 2, credit worth 100 true positive estimates per each false positive estimate).

Naturally, the above model and principles of interaction between the operator of the estimator (100) and the user (210), can be generalized to cover also various other forms of estimates beyond the binary (login candidate authenticity) classification case above, including estimates of qualitative nature (where the charging and crediting could be a function of accuracy of the estimates), and estimates for multiple Y-variables produced in parallel, etc.

To support objects that may have, for a given Y-variable value, forms of subpopulations in terms of X-variable values, in certain embodiments the estimator logic is configured to provide also features as follows:

The estimator is configured to maintain in a register a score indicating the reliability of each given object model formed based on the received training objects (i.e., objects received with pre-populated Y-variables), and use such a reliability score in determining whether or how to adjust an existing model for a received training object (e.g., an object received with a Y1 value equal to that of the given existing model).

According to at least some of such embodiments, the estimator is enabled to maintain multiple, e.g., up to three, object models per a given Y-variable value. In such embodiments, if there are blank models (among, e.g., three models available) for the received Y variable (Y1) value of a training object, and a vector distance of the received training object from each of the established models for its Y1 value is above a configured threshold, a new model is allocated for the Y1 value of training variable, with the rest of the (X and any prepopulated Y) variables of such a new model set to their corresponding received values of the training object. In at least some of these embodiments, for the above purpose, a model is considered to be an "established" model once its reliability score has reached a certain configured level, such that if there are one or more non-established existing (i.e. preliminary) models for the Y1 value of the training object, the closest of such preliminary models will be adjusted based on the X (and other prepopulated Y) variable values of such a received training object. In a further embodiment still, the above mentioned threshold distance, for determining whether to adjust the closest existing model or allocate a new model, will depend on the reliability score of the existing model, e.g. so that, rather than distinct cases of preliminary and established models, each existing model has its associated threshold distance that will expand or shrink (in a configured range and with defined steps) according to its reliability score.

The reliability score for an object model, according to an embodiment, is computed as a function of a count of training objects that has been used to form that model instance, e.g. a number of training objects that have been received within the at-the-time applicable threshold vector distances (i.e., within the operating radius) from that model (up to a defined maximum score, e.g. the number of X variables in the applicable object schema times e.g. some fraction (such as ¼) of the variable value range), while the operating radius of a model is equated to, or computed as a function of, the present reliability score of the model. In some embodiments, there is a shared maximum total budget for the reliability scores of the available (sub-population specific) models for the given Y-variable value, e.g., such a budget could be one half of the sum of the theoretical maximum score configured for the available individual models (for instance, if there are up to 4 models per Y-variable value, and the maximum reliability score per an individual model was configured to be 320, the sum of the active reliability scores of these models would be limited to ½*4*320=640). When such a budget limit is reached, any increase in the reliability score of an expanding model has to be accompanied by a corresponding decrease in the reliability score of other model(s), e.g. the model with lowest (but positive) reliability score; in such an embodiment, once the reliability score of a model would be reduced to 0 (or less), the model becomes de-allocated i.e. vacated, such that the model registers are reset to a blank model (with reliability score i.e. operating radius of 0) that is available for potential new training objects received outside the operating radius of the surviving model(s). Further still, according to at least some embodiments, an individual model's reliability score can be increased beyond the configured maximum score if and only if there is another model (with lesser existing operating radius) whose reliability score can be decreased by an equal amount (to not less than 0); that way, a model that resulted from an invalid training object will get erased by providing sufficient amount of valid training objects. Moreover, once the increasing reliability score i.e. the expanding operating radius of a given object model, reaches another model, that one of such overlapping model with smaller reliability score is vacated. According to an alternative embodiment, the (X) variable values of such a merged model vector are computed as a reliability-score weighted average of the variable values of the merging models.

Note that an estimator logic operating with just a single model enabled per a Y-variable value is simply a special case of the above discussion, such that will not adjust the established model based on a training object received with the Y-variable value at too far a vector distance from that singleton model.

In the embodiment of the estimator (100) under study, an estimated value for the dependent value is computed (170) as follows:

The estimator identifies among the object models a configured number of the models that are closest matches to the received object and produces the Y1 values of those models as the estimate values for Y1 for the given object, along with their respective weights. If the configured number of closest matching models to be identified is one, the estimator will naturally produce only the Y1 value of the single closest matching model as the estimated value for Y1 of the received object. Note that the estimator will in this manner produce this estimated value also for the received objects that had this dependent variable pre-populated.

The closest object model is the one that has the shortest vector distance to the received object, when considering the values of the independent variables. As a computationally efficient approximation of the actual vector distance (sum of the squared differences between the values of the independent variables of received object and the given model object, and square root of that sum if the actual distance is needed rather than just the identification of the model with shortest distance to the received object), the block or "Manhattan" distance can be used, which is simply the sum of the absolute values of the differences between the received and model values of the independent variables.

In addition to the (e.g., block) distances between the received object and the object models (each model corresponding to their respective values of Y1) that are computed through equally considering component-distances of the received and object values of each of the independent variables (X1, X2, X3 and X4 in Table 1), various embodiments of the estimator will also form variants of these measures of distance between the received object and the models, e.g. as follows:

Inclusion of synthesized variables: The set of predictor variables, based on values which the estimator produces the values for the dependent variables, can be augmented to include, besides the original independent variables of the received objects, also variables whose values are synthesized, at least in part, based on the values of defined independent variables. In various embodiments of the estimator, such synthesized variables include:

A variable indicating a presence of a defined value pattern in certain other predictor variables (e.g., in reference to Table 1, positive value in variables X2 and X3 but 0 in X1); if the defined pattern is found, this synthesized variable could be assigned, e.g. to a mid-point of the supported value range, while kept at 0 otherwise. In an embodiment, the estimator is configured to produce such a synthesized predictor via a pair of configuration registers that each have a bit position corresponding to each of the independent variables, where bits activated (e.g., set to logic '1') on the first and second of the pair of the configurable registers indicate those of the independent variables that, respectively, need to have a non-zero and zero value for this synthesized variable to be activated (set to non-zero value, e.g. mid-point of the supported range) for the given received object. For the above mentioned example pattern among the variables X1-X4, this pair of configuration registers would be set to binary values "0110" and "1000", respectively, where the $n^{th}$ leftmost bit in each of the four bit registers refers to variable Xn and n=[1,2,3,4].

A synthesized variable approximating the ratio between a defined pair of the predictor variables, e.g., with reference to Table 1, X1 divided by X2. Such an approximate ratio can be efficiently computed in hardware logic as follows: The logic will produce the applicable power of two multiples of X2 (e.g., in case the ranges for X1 and X2 are within 0 . . . 254, X2 multiplied by 2, 4, 8, 16, 32, 64, 128 and 256) and identify from such multiples of X2 the one that is closest to X1, and use the corresponding multiplier as the value of the synthesized predictor variable used to approximate the ratio X1:X2. In an embodiment, the estimator is configured to produce such a synthesized predictor via a pair of configurable registers that respectively identify the dividend and divisor variables (among the independent variables) for the quotient to be approximated via this synthesized predictor variable.

A synthesized variable approximating the product of a defined pair of the X-variables, e.g. X1 and X2. Such a product of two variables, each in the range of 0 . . . 255, could be looked up from a 64 k-deep table, where the address to such look-up-table (LUT) is the concatenated binary value of X1 and X2, and the data value at each given LUT address is the pre-computed product for the corresponding (X1,X2) pair on the address bus. Such a product, in the range of 0 . . . 64516, can be divided (rounding down) into 252 subranges of 256 values ([0,255], [256,511], [512,767], . . . [64256,64511]), and one way to approximate the product of two [0,255] variables is to use a concatenation of the four most significant bits (MSBs) of the X-variables as an address key to a 252-deep LUT storing the approximate product values for the pairs of X-variables. Note that for better accuracy of the approximation, the LUT address can be incremented by one, for each case of the $4^{th}$ MSB of the given X-variable, and the $5^{th}$ bit of the other X-variable of the pair, being both '1'. In an example implementation of such approximation, the LUT holds at its address formed by concatenation of the 4 MSBs of the X-variables being multiplied (denoted by X1[7:4],X2[7:4]) the pre-computed product of X1[7:4] and X2[7:4]), the LUT address line value will be (X1[7:4],X2[7:4])+X1[5]*X2[4]+X2[5]*X1[4], where the product operator '*' for the $5^{th}$ and $4^{th}$ bits naturally can be implemented by the logical AND function of these bits.

When configured to form one or more synthesized variables for the received objects, for any training objects received (objects received with valid values for their Y variables), the estimator will also include such synthesized variables along with the original independent variables in the respective object models, so that any differences between received and model values of such synthesized variables are available for computing variants of the vector distances between the received objects and the array of model objects.

Exclusion of predictor variables: To prepare for possibilities that some of the independent and/or the synthesized predictor variables may have little to no predictive value for a given dependent variable, according to an embodiment, the estimator logic will produce variants of the received and model object vectors for the distance measures also as follows:

The estimator will compute variants of the distances such that omit the component distance of a given one of the predictor variables. Thus, if there are four original independent variables and three synthesized predictor variables produced by the estimator, i.e. a total of seven predictors, there will be seven such omit-one variants of the vector (e.g., block) distances, in addition to the distance that (in case of using the block distance approximation) is the sum of the absolute differences between the values of each of the seven predictor variables of the received and the model objects.

As an example based on the object schema per Table 1, computation of the omit-the-$3^{rd}$-predictor variant of these block distances between a received object and a given object model is illustrated in the Table 3 below:

TABLE 3

Example of computation of a block distance variant between received and model values of an object vector.

|  | X1 | X2 | X3 | X4 | Effective distance |
|---|---|---|---|---|---|
| Received object | 254 | 7 | 127 | 0 |  |
| Object model | 254 | 0 | 41 | 211 |  |

TABLE 3-continued

Example of computation of a block distance variant between received and model values of an object vector.

| | X1 | X2 | X3 | X4 | Effective distance |
|---|---|---|---|---|---|
| Absolute difference | \|0 − 0\| = 0 | \|7 − 0\| = 7 | \|127 − 41\| = 86 | \|0 − 211\| = 211 | 0 + 7 + 0 * 86 + 211 = 218 |

Different forms of desired variants of the block distances between the received and model values for objects can be formed by appropriately modifying the example computation shown in Table 3, for instance as follows:

Rather than omitting the distance between the received and model values for the $3^{rd}$ independent variable (X3) for computing the sum of the component distances for the effective distance, this omission can be applied for the component distance of any of the other independent variables (X1 through X4 in the examples of Tables 1 and 3).

Naturally, it is typical to form also a measure of the distance that does not omit the component distance of any of the independent variables.

The component difference of more than one, and up to all but one, of the independent variables can be omitted from a given variant of the effective distance measure.

It is possible to use varying weighting coefficients for the different component distances of the individual predictor variables. In the example of Table 3, these coefficients are 1, 1, 0 and 1 for the variables X1, X2, X3 and X4, respectively. For another variant of an effective distance between the received and model object, these co-efficients could be e.g. 4, 2, 1 and 0, when the effective distance measure would be 4*0+ 2*7+1*86+0*211=100.

Rather than using the absolute values for the differences between the received and object values for the individual independent variables, the squares of these difference components can be used for summing up a measure of the effective distance. The (approximate ranges for) the squared values can be looked-up from a pre-computed table, with the same principles are discussed above for computing the product of the independent X variables within the same digital logic clock cycle.

Note that, though only one object model is shown in Table 3, the estimator logic includes an array of object models against each of which the defined set of variants of the distance between the received and model vectors of the objects are computed (in parallel), and each object model in such an array has its own associated value of the given dependent variable to be estimated. Generally, the shorter the vector distance between the received object and a particular object model, the greater will be the estimated probability that the true value of the given dependent variable of this received object is equal to the value of this dependent variable in that particular object model.

4. Computations of the Finalized Estimates Through Weighting the Variants

While noting the possibilities that, e.g. per section 3 above, some of the predictor variables (variables X1 through X4 in the example of Table 3) may be synthesized variables formed based on the received independent variables of the objects, as well as that various forms of weighted sum etc. type variants of the effective distance can be formed based on the predictor variables, for purposes of focusing the discussion below, concerning the production (170) of the finalized estimates for a given independent variable (Y1 in Table 1) based on the distance variants, it is assumed from hereon that the embodiment of the estimator under study is configured to compute, besides the vector distance between the received and object model values for each of the predictor variables, an omit-one type variant of this distance per each of the predictor variables. That is, such an embodiment of the estimator will compute variants of the effective distance based on the example of omit-the-$3^{rd}$-predictor shown in Table 3 such that, rather than omitting the $3^{rd}$ predictor (X3), each variant will omit one of the other predictors X1, X2 and X4. Naturally, also the $3^{rd}$ predictor omitting vector distance per the example of Table 3 will be computed, as will be the vector distance that does not omit the contribution distance of any of components X1 through X4. Tables 4 and 5 below illustrate the forming of this set of alternative estimates for the given dependent variable to be estimated:

TABLE 4

Example: Alternative estimates for the dependent variable Y1 pointed by the variants of the effective distance between the received and model values of the object vectors.

| Predictor omitted for the variant | Effective distance to the object model per Table 3 | Value of Y1 of the closest object model for this variant | Weighting coefficient of the variant |
|---|---|---|---|
| none | 0 + 7 + 86 + 211 = 304 | 3 | 202 |
| $1^{st}$ (X1) | 0 * 0 + 7 + 86 + 211 = 304 | 3 | 36 |
| $2^{nd}$ (X2) | 0 + 0 * 7 + 86 + 211 = 297 | 8 | 82 |
| $3^{rd}$ (X3) | 0 + 7 + 0 * 86 + 211 = 218 | 7 | 248 |
| $4^{th}$ (X4) | 0 + 7 + 86 + 0 * 211 = 93 | 5 | 175 |

TABLE 5

Example: Weighted voting among the alternative estimates.

| Alternative estimate for Y1 | Weighted votes for the estimate |
|---|---|
| 3 | 202 + 36 = 238 |
| 5 | 175 |
| 7 | 248 |
| 8 | 82 |

In the example illustrated in Tables 4 and 5 above, while the estimate value '3' received most raw votes among the alternative estimates produced based on the variants of the distances between the received and model object vectors (i.e., Y1 value '3' was voted by two of the variants, vs. one or zero voting variants for other potential estimate values), due to the differing weights given to the differing variants, the estimate value '7' however received most effective votes (vote by one variant, however with high weighting coefficient), and consequently the value of dependent variable under study (Y1) is estimated to be '7' for the given received object by the estimator logic configured per above discussion. The resulting output object in the above discussed case will be per Table 6 below.

TABLE 6

Example of an output object.

| Tag | | Independent variables | | | | | | Dependent variables (max. value 255 is reserved for denoting a non-populated value) | |
|---|---|---|---|---|---|---|---|---|---|
| Prefix | Serial # | I/O | X1 | X2 | X3 | X4 | X5 | Y1 | Y2 |
| 8 | 8667 | 1 | 254 | 7 | 127 | 0 | 255 | 7 | 71 |

Further, according to an embodiment of the estimator (100), if two or more alternative estimates would be tied for their effective votes, the alternative with greatest amount of raw votes would win, and if also the raw votes would be tied (e.g., the tied variants had the same weighting coefficients, and the same number of voting variants), the tie can be broken in any manner without further logic complexity (e.g., simply taking the alternative estimate having the lowest value), as the estimator logic is self-correcting (as explained in section 5 below).

Yet some embodiments of the estimator can be configured with a threshold distance parameter (e.g., per each of the defined variants of the effective distance) such that, in case no object model vector exists within such threshold distance from the received object vector, no object model is considered closest (or best matching) for that variant of the object vector, and consequently, no alternative estimate value is produced for that variant (which could be implemented, e.g., by having the logic for such a variant report the reserved, invalid estimate value of 255 in place of its alternative estimate) and the final estimate will then be produced based on the alternative estimates of the other variants, which had a model within their respective threshold distances. Further, certain embodiments of the estimator can be configured to report received objects as unidentified, in case for a given received object, none one of the object variants had a model object within the respective configured threshold distance. Such reporting of unidentified object by the estimator logic can be implemented via setting the output estimate value for the given dependent variable to a value (e.g., 255) reserved for the purpose.

Note that the hereby estimated value of a dependent variable may still be postprocessed e.g. by a cast-back to its original real-world measure or quality, in certain embodiments.

For example, in case Y1 in the above example represents a qualitative variable, the estimate of '7' may be a code value for instance for a language (such as French) of a given speech recording. And in case Y1 represented a qualitative variable such a maximum sustained velocity of an aircraft, the estimated values Y1 will have to be multiplied by an appropriate factor (e.g. 100 miles per hour) to produce the real world values of the estimates.

Further, in case a given dependent variable under study represents a quantitative measure having a continuous type of value range, in certain embodiments, the estimator is configured to compute the final estimate value as a weighted average of the alternative estimates, each provided the relative weight according to the weighted votes received for the given alternative estimate. Using the values of Table 5, the estimate value of Y1 computed as such a weighted average would be: (3*238+5*175+7*248+8*82)/(238+175+248+82)=5.36. Again, this number may have to still be multiplied by the related factor (e.g. 100 mph) to produce the relevant real measure being estimated (e.g. 536 mph). In certain embodiments, the non power-of-two based division and multiplication computations needed for production of estimate values are done by a floating point microprocessor, based on the operands produced by the estimator hardware logic.

Note further that certain embodiments of the estimator can be configured to accept, within defined limits, incoming object vectors with missing X-variable values, denoted by a reserved value such as 255 on the vector component for the given X-variable, and within the defined limits, such an embodiment of the estimator will produce its estimated values for missing X-variables of received objects. According to some of such embodiments, if an incoming object with a missing X-variable (assume, X2) was a training object (e.g., the object value had a valid value, assume 117, for Y1), the outgoing object vector will have on its X2 component the value of X2 of the object model vector corresponding to Y1 value 117. And in case such an incoming model did not have its Y-variable prepopulated, if the object vector has a sufficient number of valid X-variable values, the estimator will produce an estimate for Y1 as described herein, except for omitting the missing X-variable components from the vector distances between the received and model objects, and use the values of the missing X-variables of the model vector associated with the estimated Y1 value as estimates for values of the missing X-variables. However, if an incoming object did not have a defined minimum amount of valid X variables (i.e., had too many invalid i.e. missing X-variables), or had incompatible pre-populated Y-variable values with respect to the model objects, the estimator according to such embodiments will mask the missing variables to values reserved for the purpose (e.g. 255).

5. Auto-Tuning the Estimator Based on Received Training Objects

In addition to producing the estimates per above, the estimator logic, according to an embodiment of the technology, will use any pre-populated values of the dependent variables (in the example of Table 1, Y1 and/or Y2) also for auto-tuning its parameters, including the object models and the weighting coefficients of the alternative estimate variants.

The initialization and adjustment of the object models based on received training objects, e.g. as discussed in sections 2 and 3 above, results in that the training objects received with their pre-populated, correct values on their dependent variable fields are utilized by this online-trained estimator to continuously refine and/or augment its array of models for the objects to be classified, scored etc., recalling that each object model vector includes its associated values for the dependent variables that the estimator is to estimate.

The weighting coefficients for the predictor vector variants producing their alternative estimates, e.g. per the rightmost column in the example of Table 4, are based on assessed estimation accuracy of the variants, as accumulated over time through comparing the variants' respective estimated and any pre-populated values of the dependent variables of the received objects.

According to an embodiment of the estimator, these weighting coefficients reflect the variants' estimation accuracy ranks and are computed per the below procedures, performed for any object received with a pre-populated, correct value for the dependent variable under study, and for each of the configured set of variants of the model—object vector distance metrics:

The logic decrements the coefficient of the given variant (down from an initial value of e.g. 1023, until 0) by the present distance of this variant of the received object vector to the corresponding (e.g., omit the $3^{rd}$ predictor) variant of the correct model object vector. This decrement-by-value, referred to as distance V, in the example of Table 3 would be equal to 218 in case the object model in that table was the one associated with the correct value of the dependent variable being studied. Accordingly, if in that context (of Table 3) the effective distance had been 0 (rather than 218), the coefficient for this omit-the-3rd predictor distance vector variant would not get decremented at all (V=0), due to its accuracy in that case.

In addition, if the given variant estimated the value of the studied dependent variable correctly (e.g., among the omit-one-predictor vector variants, this variant of the received object vector was at the shortest distance from the correct one of its corresponding variants of the model object vectors), the logic also increments (e.g., until 1023) the given variant's coefficient by the difference between (a) the distance of the furthest-away variant to its corresponding vector variant of the correct object model, and (b) the distance V per above. For instance, in the case that the variant per the example of Table 3 did estimate the value of the dependent variable under study correctly, and the furthest-away variant was at distance 304 from its corresponding variant of the correct model vector, the weighting coefficient of this (omit-the-$3^{rd}$-predictor) variant will also be incremented by 304−218=86, i.e., in net, the coefficient for this variant will be adjusted by (−218+86)=−132 points, however not to a value less than 0.

In scenarios where multiple Y-variables (e.g., Y1 and Y2) are to be estimated for the objects, according to at least some embodiments, the above described logic operations and resources are implemented in parallel and in alike manner for each such Y-variable, e.g., so that there will be Y-variable specific object model arrays, i.e., predictor variable model vectors for each so far received value of Y2 etc., just like for Y1. The predictor variables, including for the model vectors, for a given Y-variable can in certain embodiments include also the other Y-variables. The above described arrangements thus allow using training objects with any combinations of the Y-variables pre-populated.

As illustrated in FIG. 2, the consuming agent (210) for the estimated objects (335) will detect any false estimates—in some embodiments, that is, estimate values that differ from their corresponding ascertained actual values by more than a configured threshold—and in response to determining that an estimated object produced by the estimator (100) included a false estimate for one or more for its Y-variables, the consumer will insert the ascertained actual Y-variable value(s) for such a falsely estimated object vector and send (215) such object with the correct prepopulated Y-variable(s) back to the estimator (100) as a training object.

6. Hierarchical Estimation

Figure 3:
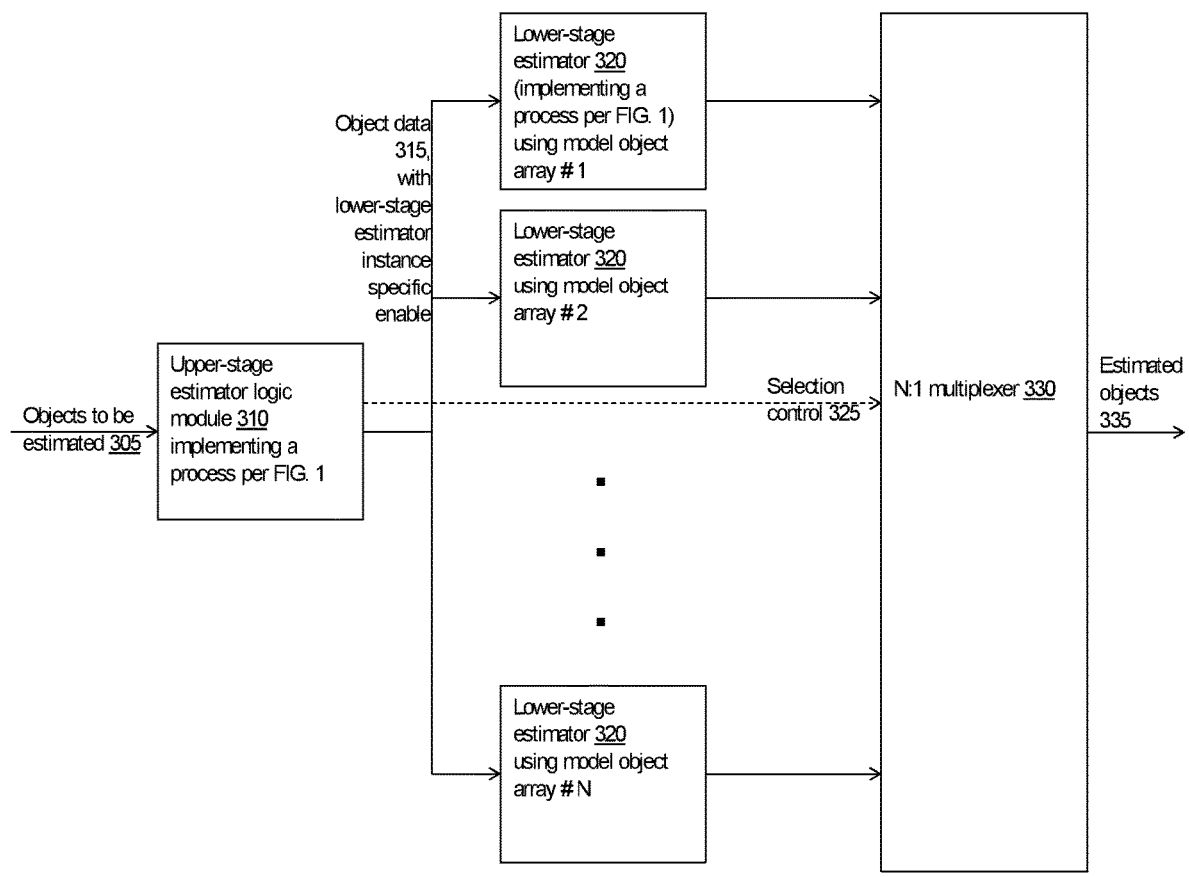
FIG. 3 illustrates a hierarchical arrangement of estimator logic modules, each implementing an estimation process such as the example process of FIG. 1.
Figure 4:
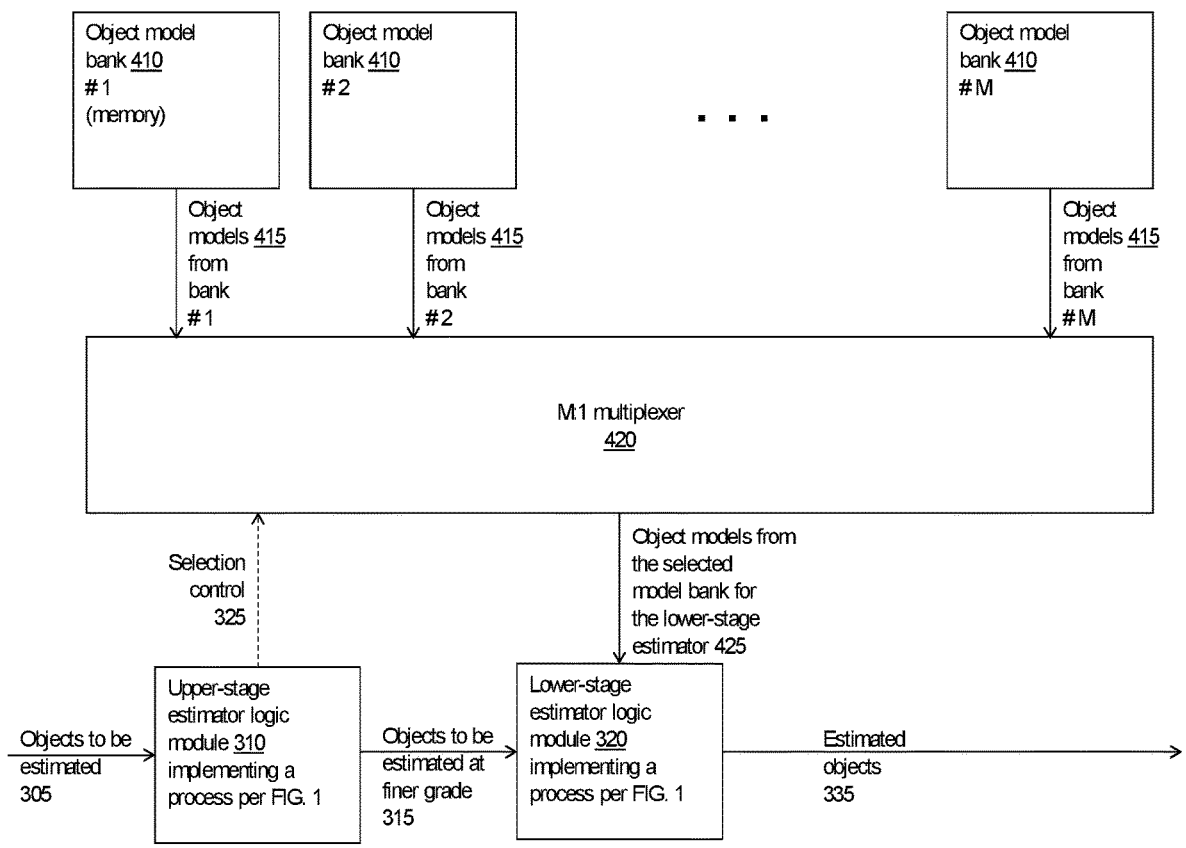
FIG. 4 illustrates a resource-efficient way of implementing some or all of the lower-stage estimator modules of FIG. 3 using dynamic multiplexing of active object models for a given lower-stage estimator, according to the upper-stage estimation of the given object.

Further, in certain system configurations, as illustrated in FIGS. 3 and 4, the estimator (100) logic modules per this description are assembled in two or more stages, to operate in a hierarchical arrangement, where the upper (e.g. $1^{st}$) stage (310) estimator seeks to identify (325) an appropriate lower (e.g. $2^{nd}$) stage (320) estimator, or an appropriate sub-space (410) for the low-stage estimation, for any given incoming object (305) based on the upper-stage estimation of the given object, and so forth down (315) the chain of estimator stages, until the given object is estimated (335) down to the relevant level of detail. In at least some of such arrangements, as illustrated in FIG. 4, the identification (325) of an appropriate lower-stage estimator involves selecting the relevant bank (410) of model objects, from a collection of such banks, corresponding to the higher-level (310) estimation of the given incoming object. In other words, an earlier estimation stage identifies (325) an appropriate sub-space for estimating at a greater level of specificity a given unknown variable of the given object. Note that, for avoidance of confusion, what was referred to in the discussion of an individual estimator module above (related to FIG. 1) as an array of object models, is in the discussion of hierarchical estimation arrangements (e.g. FIG. 4) referred to also as a bank of object models, in view of that the active object model bank is to be selected from yet another array of such banks, with such a further array thus referred to as a collection of object model banks.

As an example operating scenario, if a hierarchical estimator per FIGS. 3 and 4 is deployed for an application of estimating certain aspects of aerial objects, the upper stage (310) of estimation could seek to classify (the vector representation of) a given object between classes such as man-made equipment, living creatures, and other solid matter objects, while the lower stage (320) estimation would then seek further classify, characterize or quantify the given object within the classification (e.g., living creatures) identified (325) for the given lower-stage estimator instance by the upper-stage estimation, e.g., to identify the flying living creature as birds, bats, parachutists, etc. A further estimation stage downstream (335) could seek to estimate yet further aspects for the received object vector within that sub-classification, e.g., quantity and/or the species of the birds, etc.

The notion of sub-space (410) as used in this discussion of hierarchical estimation, when estimating quantitative variables of the incoming (305) objects, will refer to value ranges of such variables. For instance, in a two-stage hierarchical estimator setup, the upper-stage (310) estimator can be configured to seek to identify (325) the most likely value range, and the lower-stage estimator (320) the most likely value in that identified range, for the given quantitative variable of an incoming object to be estimated. In such an arrangement, the upper-stage estimator (310) produces a defined number of upper bits (325), and the lower-stage estimator, the remaining lower bits for the binary value of the qualitative variable estimate (335). For cases of estimating qualitative variables, the notion of sub-spaces at different stages of a hierarchical estimator setup will apply to upper level categories and their respective sub-categories, in the applicable classification taxonomy. Some embodiments of hierarchical estimator arrangements can also involve combinations of qualitative and quantitative estimation stages and can produce estimates, using the example of flying objects, of a form such as: a flock of birds; size between 512 and 1023.

Moreover, the estimates produced by upper-stage (310) estimators can include identifications (325) of a set of (e.g., top four) most likely applicable sub-spaces (410) for lower-stage (320) estimation. In such arrangements, the relative levels of object-model matches (closeness of received object variable values to those of the best model at a given stage of estimation in the identified sub-space) from the lower-stage (320) estimation processes of their respective sub-spaces can be considered together with the probabilities of the such sub-space (410) as identified (325) by the upper-stage (310) estimation process, when producing the final estimates (335) for the given variable of objects being estimated. For instance, if the upper-stage estimation identified two equally likely sub-categories ("A" and "B") for a given object, while the lower-estimation from the category "A" did not identify any model object within whose radius the given object was in that stage of estimation, while the lower-estimation from the category "B" did identify a particular model object "5" within whose radius the given object landed, such a two-stage estimator could be configured to estimate that object as "B.5". Various modifications will be apparent from this discussion, e.g., where the multi-stage estimator will compute an overall probability score for each identified alternative categorization path (for instance, in the above scenario, "50%*0%=0% for "A.x", and 50%*100%=50% for "B.5"), and use such overall probability scores in producing the final estimates for the received objects.

In an embodiment per illustration of FIGS. 3 and 4, the upper-stage estimator produces upper bits, and the relevant lower-stage estimator, lower bits, for the eventual estimate variable value produced. Moreover, the upper estimate bits produced by the upper-stage estimator are used for selecting the appropriate lower-stage estimator module (per illustration in FIG. 3) for a given incoming object, and, in an implementation of the parallel lower-stage estimators of FIG. 3 using the multiplexing (420) per FIG. 4, selecting the appropriate active object model bank for the lower-stage estimator module. Whether the portions of the estimated value produced by the upper and lower estimation stages can be directly concatenated (as in the above discussion of producing most and least significant bits for a quantitative estimate value) or not (e.g., when combining qualitative and quantitative estimation stages), the digital representations of the upper level estimation results are used as the selection control signal for the lower-stage estimation multiplexers (330, 420) per FIGS. 3 and 4, in order to carry out the lower-stage estimation for the applicable sub-space(s) identified by the upper-stage estimation.

Note that the estimator module instance labeled in FIG. 4 as the upper-stage estimator may, in arrangements having three or more stages, operate as a lower-stage estimator for a yet another upper-stage estimator which connects to and interacts with the estimator labeled as upper-stage in FIG. 4 similarly to how this upper-stage estimator of FIG. 4 connects and interacts with the estimator labeled as lower-stage in FIG. 4. Similarly, the estimator labeled as lower-stage in FIG. 4 may in some arrangement operate as an upper-stage estimator to yet a further stage of estimator(s) which would function as lower-stage estimator(s) for that estimator labeled as lower-stage in FIG. 3. The references to FIG. 4 in this paragraph apply the same way to FIG. 3, with the possibility that there would be multiple parallel estimator module instances at a given stage of estimation considered as a lower-stage.

Regarding implementation scenarios per FIG. 4, where for a given estimator module the active object model bank (410) is dynamically multiplexed (420) from a collection of alternative model banks, according to an identification (325) of an appropriate sub-space for estimation at that stage, note that in various embodiments, different methods for connecting the estimator hardware logic with the dynamically selected (425) object model bank can be implemented, according to the applicable design goals such as performance, capacity and cost objectives.

On one end, when seeking maximized performance, the design per the model of FIG. 3 can be implemented, such that for each of the available object model banks, a respective estimator hardware logic module instance is provided, so that there is no need for switching (420) the active model bank from a set of alternatives for any given estimator module at that stage (as each model bank has its own estimator module). That implementation practice has a number of performance advantages, including avoidance of any complexities or delays that may be caused by having to multiplex (420) the appropriate object model bank (410) according to the active sub-space identified (325) for that stage of estimation of the given input object. Additionally, that practice (per FIG. 2) enables the possibility for activating estimation at that stage concurrently for up to all of the available sub-spaces, which could be useful (e.g., in case the upper-stage estimation did not identify any particularly likely sub-spaces for the lower-stage estimation).

On the other end, there can be just a single estimator logic hardware module for the given lower-stage (320) estimation process, for which module the active object model bank (410) will be dynamically multiplexed (420) from the full set of available model banks. Such a practice has the cost-efficiency advantage of avoiding the need for multiple estimator logic modules for the given stage.

Yet, certain embodiments can implement various mid-point solutions between the above ends. In these embodiments, for a given (lower) stage of estimation, there will be some number (N) of parallel instances of the estimator module, for each of which one of a larger number (e.g., N times M, where N and M are some positive integers) of the available object model banks is dynamically loaded (420). In some of such embodiments, for any given one of the N parallel estimator instances, there is its own subset of M (rather than the full set of N*M) object banks from which to connect the active object bank selected (425) for estimation of the current input object. Such arrangements can allow having large collective volumes of lower-stage object model banks held in a distributed manner at directly (e.g., same clock cycle) accessible on-chip register arrays, for dynamic loading (420) onto their respective lower-stage estimators, while still supporting hierarchical object estimation with extensive depth and breadth of model object arrays at line rate (wire-speed); that is, such hierarchical estimator can process incoming objects (305) continuously back-to-back, without accumulating backlog and while keeping the object input-to-output estimation latency minimal and constant. The notion of clock cycle in the discussion of the estimator logic herein refers to the time intervals between which a new object vector may be presented at the data input (305, 315) to an estimator logic module (310, 320) per FIGS. 3 and 4, or the estimation (100) process per FIG. 1.

However, assuming it takes K (a positive integer) system clock cycles to load the selected object bank (425) to any one of the N lower-stage estimator modules, in order to achieve and maintain line rate throughput with a hierarchical estimator per FIGS. 3 and 4, the incoming object may have to be buffered for up to K clock cycles, until its applicable object bank is loaded for the given lower-stage estimator and this (lower) stage of the estimation can thus be performed for that object vector. In addition to the (first-in, first-out) buffer i.e. FIFO with capacity to queue at least K input object vectors, in order to prevent accumulation of backlog of objects to be estimated by the given hierarchical estimator arrangement per FIGS. 3 and 4, there will preferably be at least K parallel instances of estimator modules for the discussed lower stage, while each of such parallel lower-stage estimator instances should also have access to the full set of object model banks applicable for that stage, from which set the active bank is to be dynamically loaded for the given one of the parallel estimator instances according to the upper level estimation of the given input object being directed to the given lower-stage estimator instance. With such an arrangement, at the latest by the time that the FIFO capable of queuing up to K input object vectors could be filling up, in the worst case scenario, the object vector having spent the longest time in the FIFO (e.g., K clock cycles) would have its appropriate object model bank loaded into the lower-stage estimator instance which that given object vector is being demultiplexed to. These arrangements, tolerating multiple (up to K) clock cycles of delay for loading the appropriate active model bank for an estimator module while maintaining line rate throughput, enable supporting larger capacities of object model banks, held, e.g., at on-chip or off-chip storage regions such as random-access memories (RAMs) from where the active model banks are dynamically loaded onto the parallel estimator instances as demanded for their respective sub-streams of the input objects. The demultiplexing of incoming objects from an upper-stage to the lower-stage estimator is, in an embodiment, implemented via lower-stage estimator instance specific enable signals (FIG. 2, within signal flow 315), connected along with the object vector data from the upper to lower stage estimators.

Given that mechanisms and principles of connection and interaction between the estimation stages are architecturally and functionally similar throughout various possible hierarchical arrangements, it is sufficient to define these inter-stage mechanisms only between two estimation stages, in order to enable in effect any extent of multi-stage estimation using these same principles. Accordingly, based on the examples of FIGS. 3 and 4 and the related descriptions, there will be no particular limits for numbers of stages in various hierarchical estimation arrangements, or of parallel estimator module instances or object model banks per a given estimation stage.

As an example, a 3-stage estimator supporting 256 categories per a stage, will allow finding the closest matching object model(s) for an incoming object from up to $256^3=16,777,216$ individual models, each with potentially their unique associated value for any given object variable to be estimated. Notably, if, based on the specifications herein for the estimation hardware logic, each of such three estimation stages is able to identify the most likely sub-space (from the up to 256 choices per stage) for an input object in one hardware logic clock cycle, the 3-stage estimator is able to identify the most likely model, and its associated estimate value, from the up to $256^3$ i.e. more than 16 million possibilities, in 3 clock cycles. Moreover, in a case where the given incoming object was a training object, the estimation parameter tuning per the descriptions in the foregoing will also be handled online, in the same clock cycles. Furthermore, in a case where one or more stages of such a 3-stage estimator identified was configured to identify up to four most likely sub-spaces for the eventual estimate value, while such a hierarchical estimator was further configured to identify the most likely eventual estimate value(s) using the respective probabilities for each identified alternative object categorization path, and such processing consumes a further clock cycle, the hierarchical estimation of the most likely estimate value (from up to 16M possibilities), or e.g. up to four most likely estimate values (with their respective probabilities, expressed, e.g., as a numerator-denominator pair, or as an index in a defined range), will be completed in four clock cycles. In the example where one clock cycle was one nanosecond (ns), the 3-stage self-tuning hierarchical estimator would identify the most likely estimate values (i.e., one class from up to 16M classes of a qualitative estimate variable) for objects at rate of 1 object/1 ns=$10^9$ objects per second, with a constant object processing input-to-output latency of 4 ns. Such streaming objects, or more precisely their vector representations, could, in various applications, model online postings (e.g., new text, image, or multi-media content on various channels or forums on the Internet), or physical measurements and observations of certain industrial and/or natural processes or systems of interest based on sensor data, image frames etc., and combinations thereof. Naturally, certain object streams could also come from various forms of data records or archives to be scanned through, e.g., for training the estimator, or for searching for historical occurrences of a given event or variable pattern etc. The estimation results, at rates of millions of objects estimations per second, can in various applications be used for producing one second summaries of occurrences of objects or events per the estimated categories or value ranges, or for realtime detection and capturing of particular occurrences (e.g. variable patterns within object vectors, or object patterns with object streams) of interest at a given time for a given purpose, or for driving control signals of an industrial or a business transaction system, etc. Generally, various types of stream and complex event processing applications etc. can be supported with estimator embodiments based on the descriptions herein.

In the above detailed description, the continuous tuning of the estimation system parameters based on any pre-populated values of the Y-variables of the received objects, including updating of the object models, and adjusting the weighting coefficients associated with the variants for the distance measures between the received and model vectors for the objects, correspond to the training-phase of conventional machine learning (ML) technologies, where these training functions typically have to be done off-line rather than during ongoing production operations. The identification of the closest object models for the received objects and the production of estimate values for the Y-variables correspond to the execution-phase of traditional ML or artificial intelligence (AI) systems. Notably, based on the descriptions above, all of these functions of the self-tuning online estimator may be efficiently done in digital hardware logic, in parallel for all mutually independent procedures, for minimized latency object processing latency, including for continuously training the estimator during production operation.

Moreover, the described estimator architecture is designed to be generic across any form of AI and ML applications and use-cases involving analysis of systems, events, processes etc. that can be modeled as feature vectors of their characteristic values. As such, beyond some amount of objects with pre-populated values for the Y-variables, the described estimator does not, in preferred embodiments, need any application code, scripting etc. customization for different usage scenarios. Notably, the described online estimator, in preferred embodiments, does not need any configuration or such regarding the actual nature of the object data it processes; the estimator logic as described will work the same irrespective of what information the values of the various X and Y variables of the objects will represent in any given usage scenario. This carries significant security and operating benefits, as, in these preferred embodiments, there will be no risk of leak of sensitive information when using the online estimator per this description for analyzing object sequences that may represent (behind the generic, masked vector representations) any types of real world matters, as well as there being no need for use-case specific programming of the estimator, which automatically adapts itself to prevailing inter-variable dependencies of object streams.

The incoming (to-be-estimated, or training) objects for embodiments of herein described estimator technology are typically digital representations of observations or states of certain real-world (physical) processes, artifacts or instrumentations or the like (generally, object feature vectors) that, besides apriori knowable or controllable factors, have also certain properties, which, while typically becoming knowable overtime, cannot be readily measured or directly controlled, yet would be highly valuable if they could be estimated as early as possible with at least some useful level of accuracy and reliability. The continuously improving estimates of such hidden or latent features of objects, produced by implementations of the above described self-tuning online estimator, can, in turn, in embodiments of systems incorporating such an estimator, e.g. for processing streams of object feature vectors, be used to achieve various types of desired real-world effects—for example, displaying alerts or recommendations on human user visible media corresponding to given estimate values, and/or sound, vibration etc. effects for such alerting or recommendation purposes, or adjusting control settings for certain equipment or instrumentation, e.g., a transportation system or vehicle, an industrial production facility, fleet, machine, device etc. based on the estimated values of such properties of interest.

The object processing data path functionality described in this specification, where not otherwise mentioned, for minimized latency and maximized throughput, is preferably implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality. Aspects of the object processing data path functionality may be delivered via a network computing environment, such as a cloud computing environment.

Generally, this description and drawings are included to illustrate architecture and operation of practical embodiments of the disclosure, but are not meant to limit its scope. For instance, even though the description does specify certain system elements to certain practical types or values, persons of skill in the art will realize, in view of this description, that any design utilizing the architectural or operational principles of the disclosed systems and methods, with any set of feasible types and values for the system parameters, is within the scope of the teachings. Moreover, the system elements and process steps, though shown as distinct to clarify the illustration and the description, can in various embodiments be merged or combined with other elements, or further subdivided and rearranged, etc., without departing from the scope of the teachings. Finally, persons of skill in the art will realize that various embodiments of the present disclosure can use different nomenclature and terminology to describe the system elements, process phases etc. technical concepts in their respective implementations. Generally, from this description many variants will be understood by one skilled in the art that are yet encompassed by the scope of the teachings as set forth herein.

What is claimed is:

1. A method for estimating values of unknown features of a series of objects, the objects being represented as digital feature vectors, each digital feature vector including a plurality of X-variables having corresponding values populated on the respective digital feature vector before the estimating as a plurality of received X-variables, and, for at least a portion of the series of objects, a Y-variable having an unknown value prior to the estimating, the method comprising operations performed by an estimator, the estimator comprising hardware logic configured to perform at least a portion of the operations and/or software logic stored on a non-transitory digital medium and configured to perform, when executed via processing circuitry, at least a portion of the operations, the operations comprising:
    maintaining, by the estimator on a non-transitory digital memory, an array of models for the series of objects, wherein
        each model of the array of models comprises a Y-variable value and a plurality of X-variable values corresponding to the respective Y-variable value, and
        the array of models is organized according to Y-variable values of the models;
    for each object of at least a portion of the series of objects, in realtime,
        forming, by the estimator, augmented X-variables by appending to the received X-variables a set of synthesized variables for the X-variables of the digital feature vector of the respective object, wherein
            respective values of the set of synthesized variables are based at least in part on values of the received X-variables of the respective object,
        computing, by the estimator, an estimated value of the Y-variable of the respective object by
            identifying, from the array of models, a set of closest matching models based on a measure of difference between the values of at least a subset of the augmented X-variables of the respective object and a corresponding subset of the X-variable values of at least a portion of the models of the array of models, and
            producing the estimated value of the Y-variable of the respective object based at least in part on a Y-variable value of one or more models of the set of closest matching models.

2. The method of claim 1, comprising operations for processing a series of output objects produced by the estimator, such operations being performed by a consumer comprising hardware logic configured to perform at least a portion of the operations for processing the series of output objects produced by the estimator and/or software logic stored on a non-transitory digital medium and configured to perform, when executed via processing circuitry, at least a portion of the operations for processing the series of output objects produced by the estimator, wherein the operations for processing the series of output objects produced by the estimator comprise:
    ascertaining, by the consumer, an actual value corresponding to an estimated value of a Y-variable of a given object of the series of output objects;
    comparing, by the consumer, the estimated value to the actual value of the Y-variable of the given object to assess accuracy of the estimated value; and responsive to assessing that the estimated value is inaccurate, generating, by the consumer, a training object from the given object, wherein generating the training object comprises
   replacing, in the training object, the estimated value of the Y-variable of the given object with the actual value, and
   sending the training object back to the estimator as a new object of the series of objects.

3. The method of claim 2, wherein assessing accuracy comprises determining whether the estimated value is within a threshold distance of the actual value.

4. The method of claim 2, wherein the object processing operations further comprise:
   maintaining, by the consumer, an accuracy score for the estimator based on a frequency measure of accurate estimates versus inaccurate estimates among at least some objects of the series of output objects; and
   providing control, for the estimator by the consumer, to adjust a coefficient used for updating of the X-variable values of the array of models, wherein
      responsive to an increase of the accuracy score, the coefficient is adjusted to decrease the significance of the training object as used to update the X-variable values of the array of models, and
      responsive to a decrease in the accuracy score, the coefficient is adjusted to increase the significance of the training object as used to update the X-variable values of the array of models.

5. The method of claim 1, wherein the operations further comprise transmitting, by the estimator, a given object of the series of objects as an output object, wherein
   a value of the Y-variable of the digital feature vector of the output object is set to the estimated value for the given object.

6. A system for estimating values of unknown features of a series of objects, the objects being represented as digital feature vectors, each digital feature vector including a plurality of X-variables having corresponding values populated on the respective digital feature vector before the estimating and, for at least a portion of the series of objects, a Y-variable having an unknown value prior to the estimating, the system comprising:
   an array of models for the series of objects, maintained on a non-transitory digital memory, wherein
      each model of the array of models comprises a Y-variable value and a plurality of X-variable values corresponding to the respective Y-variable value, and
      the array of models are accessible using the Y-variable values of the models;
   a realtime estimator module configured as a plurality of submodules, each submodule comprising software logic stored on a non-transitory digital medium and configured for execution via processing circuitry and/or hardware logic, the plurality of submodules comprising
      a submodule for forming a plurality of subsets of the X-variables of the digital feature vector of each object of the series of objects, each subset being a respective object variant of the X-variables of a given object, and
      a submodule for computing an estimated value of the Y-variable of each object of the series of objects by for each object variant of the given object, (i) identifying, from the array of models, a respective set of at least one closest matching model based in part on a measure of difference between values of the X-variables of the respective object variant and a corresponding subset of the X-variables of the models of the array of models, and (ii) calculating, based on Y-variables of said set of closest matching models, a respective variant-specific estimate, and
      producing the estimated value for the Y-variable of the respective object based at least in part on Y-variable values of at least some of the respective variant-specific estimate for the given object, and
   a submodule for transmitting an output object comprising the estimated value.

7. The system of claim 6, wherein:
   each object variant of each object of the series of objects comprises a respective accuracy ranking; and
   producing the estimated value of the Y-variable comprises producing the estimated value using the variant-specific estimates and corresponding accuracy rankings of each object variant.

8. The system of claim 7, wherein using the variant-specific estimates comprises calculating a weighted average of such variant-specific estimates based at least in part on the respective rankings of the object variants.

9. The system of claim 6, wherein the estimator module further comprises a submodule for adjusting accuracy rankings of the object variants by, for each one of the object variants:
   based upon receiving of an object with a valid pre-populated value for the Y-variable, assessing a measure of accuracy for the respective object variant based at least in part on a relative difference between the respective variant-specific estimate, and the pre-populated value; and
   applying the measure of accuracy to adjust the accuracy ranking of the respective object variant.

10. The system of claim 9, wherein, for at least one given variant of the object variants, the respective accuracy ranking is adjusted based at least in part on
   (a) a degree of match between the respective variant-specific estimate and the pre-populated Y-variable value of the given training object, and/or
   (b) a measure of a relative frequency of occurrences that the respective variant-specific estimate has been
      (i) among a threshold number of closest variant-specific estimates compared with the pre-populated Y-variable value, or
      (ii) within a defined range of error from the pre-populated Y-variable value.

11. The system of claim 6, wherein the submodules of the estimator module further comprise:
   a submodule for processing a given object as a training object by
      identifying, by the estimator, that the given object comprises a Y-variable of the digital feature vector having a valid pre-populated value, and
      determining, by the estimator, whether any model in the array of models comprises the pre-populated value, wherein
         based upon the array of models lacking a model having a respective Y-variable value matching the pre-populated value, the estimator stores, in the array of models as an element corresponding to the pre-populated value, the values of the plurality of X-variables of the digital feature vector of the respective object, and based upon the array of models including a matching model having a respective Y-variable value matching the pre-populated value, the estimator updates the matching model by equating each of at least a subset of the X-variable values of the given model to a respective updated value.

12. The system of claim 11, wherein each respective updated value is computed as a function of the respective X-variable value of the given model prior to the updating and the values of the corresponding X-variable of one or more object variants of the respective object.

13. The system of claim 11, submodule for forming augmented X-variables by appending to the X-variables as received a set of synthesized variables based at least in part on values of the as-received X-variables of the digital feature vector of the given object,
wherein the submodule for forming the plurality of subsets, for each object of the series of objects, forms each subset of the plurality of subsets from the augmented X-variables of the respective object.

14. The system of claim 6, comprising a primary estimator and a collection of secondary estimators, with each of the secondary estimators having its own specific array of models, wherein the respective Y-value estimate produced by the primary estimator for the given object is used for selecting an appropriate one of the secondary estimators for performing estimation at deeper level of detail for the given object, based on the specific models of such selected secondary estimator.

15. The system of claim 6, wherein the estimator module is a first estimator module, the system further comprising:
a collection of object model banks; and
a second estimator module logically connected in series to the estimator module, wherein
the system comprises logic for selecting, for each object of the series of objects, one of the model banks of the collection of object model banks as the array of models to be used by the second estimator, wherein
selecting of one of the model banks, by the logic for selecting, is based at least in part on the respective estimate value produced by the first estimator module.

16. A method for estimating values of unknown features of a series of objects, the objects being represented as digital feature vectors, each digital feature vector including a plurality of X-variables having values populated on corresponding components of the respective digital feature vector before the estimating as a plurality of received X-variables, and, for at least a portion of the series of objects, a Y-variable having an unknown value prior to the estimating, the method comprising operations performed by hardware logic configured to perform at least a portion of the operations and/or software logic stored on a non-transitory digital medium and configured to perform, when executed via processing circuitry, at least a portion of the operations, the operations comprising:
maintaining, on a non-transitory digital memory, an array of models for the series of objects,
wherein
each model of the array of models comprises a Y-variable value and an augmented vector of X-variable values corresponding to the respective Y-variable value, and
the array of models is arranged according to the Y-variable values of the models; and
for each object of the series of objects, in realtime,
forming the augmented vector of X-variables of the respective object by appending to the received X-variables one or more synthesized variables, wherein
each synthesized variable is based at least in part on one or more values of the received X-variables of the respective object,
computing an estimated value of the Y-variable of the respective object by
identifying, from the array of models, a set of closest matching models at least in part by comparing X-variables values of the augmented vector of individual models of the array to the X-variable values of the augmented vector of the respective object, and
transmitting the respective object as an output object, wherein, for at least a portion of the series of objects where the Y-variable of the respective object had an unknown value prior to the estimating,
a populated value of the Y-variable of the digital feature vector of the output object is computed based at least in part on Y-variable values of the set of closest matching models.

17. The method of claim 16, further comprising:
forming, for each object of the series of objects, subsets of X-variable values of the augmented vector of X-variables, each such subset of the augmented X-variables referred to as a respective object variant, wherein
identifying the set of closest matching models comprises, for each given object variant of the respective object, finding, from the array of models, a respective closest matching model to add to the set of closest matching models based in part on a measure of difference between the X-variables of the respective object variant and a corresponding subset of the X-variable values of the models of the array of models, the respective closest matching model of the given variant being a respective variant-specific estimate; and
producing the estimated value of the Y-variable of the respective object based at least in part on the respective variant-specific estimates.

18. The method of claim 17, further comprising adjusting accuracy rankings of the object variants of the respective object by, for each object variant of the respective object:
based upon receiving an object with a valid pre-populated Y-variable value, assessing a measure of accuracy for the respective object variant based at least in part on a relative difference between the pre-populated value and the respective variant-specific estimate; and
applying the measure of accuracy to adjust the accuracy ranking of the respective object variant.

19. The method of claim 17, wherein producing the estimated value of the Y-variable comprises producing the estimated value using the variant-specific estimates and the corresponding accuracy rankings of the object variants.

20. The method of claim 17, further comprising:
receiving, among the series of objects, a given object comprising a Y-variable of the digital feature vector of the object having a pre-populated value that is a valid value; and
processing the given object as a training object by determining whether any model in the array of models comprises the pre-populated value,
based upon the array of models lacking a model having a respective Y-variable value matching the pre-populated value, storing the X-variable values of the plurality of received X-variables of the digital feature vector of the respective object in the array of models as an element corresponding to the pre-populated value, and based upon the array of models including a matching model having a respective Y-variable value matching the pre-populated value, updating the matching model by equating each of at least a subset of the X-variable values of the given model to a respective updated value, wherein each respective updated value is computed as a function of the respective X-variable value of the given model prior to the updating and the values of the corresponding X-variable of one or more object variants of the respective object.

* * * * *

UNITED STATES PATENT AND TRADEMARK OFFICE
CERTIFICATE OF CORRECTION

PATENT NO. : 11,561,983 B2
APPLICATION NO. : 16/812158
DATED : January 24, 2023
INVENTOR(S) : Mark Henrik Sandstrom It is certified that error appears in the above-identified patent and that said Letters Patent is hereby corrected as shown below:

In the Specification

At Column 16, Line 28:
Delete:
"(300)"
And insert:
-- (210) --

At Column 16, Lines 57-58:
Delete:
"each estimate 335 for an object property produced (170) by the estimator (335)"
And insert:
-- each estimate (335) for an object property produced (170) by the estimator (100) --

At Column 18, Line 41:
Delete:
"iii. The improving the"
And insert:
-- iii. Improving the --

Signed and Sealed this
Eleventh Day of April, 2023

Katherine Kelly Vidal
Director of the United States Patent and Trademark Office